US012791324B2

(12) United States Patent
Newman et al.

(10) Patent No.: US 12,791,324 B2
(45) Date of Patent: *Nov. 10, 2026

(54) SYSTEMS AND METHODS FOR LOCALIZING A RADAR SENSOR

(71) Applicant: Oxa Autonomy Ltd, Oxford (GB)

(72) Inventors: Paul Newman, Oxford (GB); Aamir Aziz, Oxford (GB)

(73) Assignee: Oxa Autonomy Ltd, Oxford (GB)

( * ) Notice: Subject to any disclaimer, the term of this patent is extended or adjusted under 35 U.S.C. 154(b) by 183 days.

This patent is subject to a terminal disclaimer.

(21) Appl. No.: 18/703,303

(22) PCT Filed: Oct. 18, 2022

(86) PCT No.: PCT/GB2022/052651

§ 371 (c)(1),
(2) Date: Apr. 19, 2024

(87) PCT Pub. No.: WO2023/067326

PCT Pub. Date: Apr. 27, 2023

(65) Prior Publication Data

US 2024/0418513 A1 Dec. 19, 2024

(30) Foreign Application Priority Data

Oct. 19, 2021 (GB) ..................................... 2114945

(51) Int. Cl.
*G01C 21/30* (2006.01)
*G01S 13/89* (2006.01)

(52) U.S. Cl.
CPC .............. *G01C 21/30* (2013.01); *G01S 13/89* (2013.01)

(58) Field of Classification Search
CPC ........ G01C 21/30; G01S 13/89; G01S 13/931
See application file for complete search history.

(56) References Cited

U.S. PATENT DOCUMENTS 9,153,067 B2 10/2015 Dobes et al.
11,232,150 B2 1/2022 Vianello et al.
(Continued)

FOREIGN PATENT DOCUMENTS

DE 102012106790 A1 1/2013
RU 2658679 C1 6/2018
(Continued)

OTHER PUBLICATIONS

S. H. Cen and P. Newman, "Precise Ego-Motion Estimation with Millimeter-Wave Radar Under Diverse and Challenging Conditions," 2018 IEEE International Conference on Robotics and Automation (ICRA), Brisbane, QLD, Australia, 2018, pp. 6045-6052, doi: 10.1109/ICRA.2018.8460687. (Year: 2018).*
(Continued)

*Primary Examiner* — Marcus E Windrich
(74) *Attorney, Agent, or Firm* — KPPB LLP

(57) ABSTRACT

Systems and methods for localizing radar sensor are disclosed including a method that obtains a radar scan comprising power-range spectra and extracts landmarks defined by range and azimuth from the scan. Descriptors are computed for the extracted landmarks, where each descriptor defines a landmark by relative ranges and azimuths in relation to other landmarks. The method accesses reference sets of landmarks from mapped environments and computes corresponding reference descriptors. The extracted descriptors are matched to the reference descriptors, and the radar sensor location is determined using the matching result. The method enables accurate radar-based localization for autonomous vehicles on low-power embedded platforms.

11 Claims, 11 Drawing Sheets

(56) References Cited

U.S. PATENT DOCUMENTS

| | | | |
|---|---|---|---|
| 11,567,497 B1 | 1/2023 | Foster | |
| 12,327,391 B2 | 6/2025 | Hehn et al. | |
| 12,493,113 B2 * | 12/2025 | Choi | G01S 13/42 |
| 2005/0286767 A1 | 12/2005 | Hager et al. | |
| 2008/0111731 A1 | 5/2008 | Hubbard et al. | |
| 2014/0204081 A1 | 7/2014 | Dobes et al. | |
| 2016/0139255 A1 * | 5/2016 | Bueschenfeld | G01S 7/411 342/146 |
| 2019/0129436 A1 | 5/2019 | Sun et al. | |
| 2020/0217943 A1 * | 7/2020 | Pishehvari | B60W 40/105 |
| 2020/0379481 A1 | 12/2020 | Newman et al. | |
| 2021/0164800 A1 * | 6/2021 | Lessmann | G01C 21/3811 |
| 2021/0213962 A1 * | 7/2021 | Pishehvari | G01C 21/30 |
| 2021/0304418 A1 | 9/2021 | Soon-shiong | |
| 2023/0072966 A1 | 3/2023 | Batsos et al. | |
| 2025/0231289 A1 | 7/2025 | Newman et al. | |
| 2025/0231295 A1 | 7/2025 | Newman et al. | |

FOREIGN PATENT DOCUMENTS

| | | |
|---|---|---|
| WO | 2023062390 A1 | 4/2023 |
| WO | 2023062392 A1 | 4/2023 |
| WO | 2023062393 A1 | 4/2023 |
| WO | 2023062394 A1 | 4/2023 |
| WO | 2023067325 A1 | 4/2023 |
| WO | 2023067326 A1 | 4/2023 |
| WO | 2023067327 A1 | 4/2023 |

OTHER PUBLICATIONS

Examination Report for GB Patent Application No. 2114809.3, Apr. 11, 2022, 5 pgs.

GB Patent Application No. 2114945.5, Jun. 21, 2022, 19 pgs.

International Preliminary Patentability Report for International Application No. PCT/GB2022/0052652, Apr. 23, 2024, 12 pgs.

International Preliminary Report on International Application No. PCT/GB2022/052640, Issued Apr. 16, 2024, 7 pgs.

International Preliminary Report on Patentability for International Application No. PCT/GB2022/052630, Issued Apr. 16, 2024, 10 pgs.

International Preliminary Report on Patentability for International Application No. PCT/GB2022/052636, Report Issued Apr. 16, 2024, 7 pgs.

International Preliminary Report on Patentability for International Application No. PCT/GB2022/052650, Apr. 23, 2024, 18 pgs.

International Preliminary Report on Patentability for International Application No. PCT/GB2022/052651, Apr. 23, 2024, 19 pgs.

International Preliminary Report on Patentability for International Application No. PCT/GB2022/52639, Issued Apr. 16, 2024, 7 pgs.

International Search Report and Written Opinion for International Application No. PCT/GB2022/0052652, Search completed Jan. 9, 2023, Mailed Jan. 20, 2023, 14 Pgs.

International Search Report and Written Opinion for International Application No. PCT/GB2022/052630, Search completed Jan. 10, 2023, Mailed Jan. 20, 2023, 12 Pgs.

International Search Report and Written Opinion for International Application No. PCT/GB2022/052636, Search completed Dec. 21, 2022, Mailed Jan. 5, 2023, 11 Pgs.

International Search Report and Written Opinion for International Application No. PCT/GB2022/052640, Search completed Jan. 3, 2023, Mailed Jan. 18, 2023, 09 Pgs.

International Search Report and Written Opinion for International Application No. PCT/GB2022/052650, Search completed Jan. 12, 2023, Mailed Jan. 20, 2023, 26 Pgs.

International Search Report and Written Opinion for International Application No. PCT/GB2022/052651, Search completed Jan. 13, 2023, Mailed Jan. 31, 2023, 23 Pgs.

International Search Report and Written Opinion for International Application No. PCT/GB2022/52639, Search completed Dec. 29, 2022, Mailed Jan. 18, 2023, 09 Pgs.

Search Report and Written Opinion for GB Application No. 2114808.5, Search completed May 27, 2022, 9 pgs.

Search Report for GB Patent Application No. 2114944.8, Jul. 29, 2022, 12 pgs.

Behzadan et al., "Adversarial Reinforcement Learning Framework for Benchmarking Collision Avoidance Mechanisms in Autonomous Vehicles", arXiv:1806.01368v1 [cs.RO] Jun. 4, 2018.

Bosse et al., "Keypoint design and evaluation for place recognition in 2D lidar maps", Robotics and Autonomous Systems, Elsevier BV, Amsterdam, NL, vol. 57, No. 12, Dec. 31, 2009 (Dec. 31, 2009), pp. 1211-1224, XP026746016, ISSN: 0921-8890, DOI: 10.1016/J.ROBOT.2009.07.009.

Brownlee, "How to Calculate Principal Component Analysis (PCA) from Scratch in Python", https://machinelearningmastery.com/, Aug. 9, 2019, pp. 1-28, XP055924999, Retrieved from the Internet: URL: https://machinelearningmastery.com/calculate-principalcomponent-analysis-scratch-python/.

Cen et al., "Precise Ego-Motion Estimation with Millimeter-Wave Radar Under Diverse and Challenging Conditions", 2018 IEEE International Conference on Robotics and Automation (ICRA), May 21, 2018, pp. 1-8, XP033403205, DOI: 10.1109/ICRA.2018.8460687.

Cen et al., "Radar-only ego-motion estimation in difficult settings via graph matching", 2019 International Conference on Robotics and Automation (ICRA), IEEE, May 20, 2019, pp. 298-304, XP033593985, DOI: 10.1109/ICRA.2019.8793990.

Chen et al., "GeoSim: Realistic Video Simulation via Geometry-Aware Composition for Self-Driving", Proceedings of the IEEE/CVF Conference on Computer Vision and Pattern Recognition (CVPR), 2021, pp. 7230-7240.

De Martini et al., "kRadar++: Coarse-to-Fine FMCW Scanning Radar Localisation", Sensors, MDPI, CH, Nov. 1, 2020, vol. 20, No. 21, pp. 1-23, XP009535871, ISSN: 1424-8220, DOI: 10.3390/S20216002.

Ding et al., "CMTS: A Conditional Multiple Trajectory Synthesizer for Generating Safety-Critical Driving Scenarios", arXiv: 1910.00099v2 [cs.LG] Oct. 2, 2019.

Ding et al., "Learning to Collide: An Adaptive Safety—Critical Scenarios Generating Method", arxiv.org, Cornell University Library, Cornell University Ithaca, NY 14853, Jul. 23, 2020, XP081706097.

Gawel et al., "Structure-based vision-laser matching", 2016 IEEE/RSJ International Conference on Intelligent Robots and Systems (IROS), IEEE, Oct. 9, 2016, pp. 182-188, XP033011403, DOI: 10.1109/IROS.2016.7759053.

Gleave et al., "Adversarial Policies: Attacking Deep Reinforcement Learning", arXiv: 1905.10615v3 [cs.LG] Jan. 17, 2021.

Himstedt et al., "Large scale place recognition in 2D Lidar scans using Geometrical Landmark Relations", 2014 IEEE/RSJ International Conference on Intelligent Robots and Systems, IEEE, Sep. 14, 2014, pp. 5030-5035, XP032676853, DOI: 10.1109/IROS.2014.6943277.

Koren et al., "Adaptive Stress Testing for Autonomous Vehicles", arXiv:1902.01909v1 [cs.RO] Feb. 5, 2019.

Koren et al., "The Adaptive Stress Testing Formulation", arXiv:2004.04293v1 [cs.RO] Apr. 8, 2020.

Kuhnl, "Road Terrain Detection for Advanced Driver Assistance System", May 21, 2013, pp. 1-152, XP055117968, Retrieved from the Internet: URL: http://pub.uni-bielefeld.de/luur/download?func=downloadFile&recordOld=2633277&fileOld=2633278.

Kuutti et al., "Training Adversarial Agents to Exploit Weaknesses in Deep Control Policies", arXiv:2002.12078v1 [cs.LG] Feb. 27, 2020.

Lee et al., "Adaptive Stress Testing: Finding Likely Failure Events with Reinforcement Learning", arxiv.org, Cornell University Library, 201 Olin Library Cornell University Ithaca, NY 14853, Dec. 4, 2020, XP081829250.

Machida et al., "Deep Photo Relighting by Integrating Both 2D and 3D Lighting Information", 2020 25th International Conference on Pattern Recognition (ICPR), IEEE, Jan. 10, 2021 (Jan. 10, 2021), pp. 8446-8452, XP033908865, DOI: 10.1109/ICPR48806.2021.9413179.

Park et al., "Semantic Image Synthesis with Spatially-Adaptive Normalization", arXiv:1903.07291v2 [cs.CV] Nov. 5, 2019.

(56) References Cited

OTHER PUBLICATIONS

Porav et al., "Adversarial Training for Adverse Conditions: Robust Metric Localisation using Appearance Transfer", arXiv:1803.03341v1 [cs.CV] Mar. 9, 2018.
Porav et al., "Don't Worry About the Weather: Unsupervised Condition-Dependent Domain Adaptation", arXiv:1907.11004v1 [cs.CV], Jul. 25, 2019, Retrieved from: https://arxiv.org/pdf/1907.11004, 8 pgs.
Porav et al., "Don't Worry About the Weather: Unsupervised Condition-Dependent Domain Adaptation", 2019 IEEE Intelligent Transportation Systems Conference (ITSC), IEEE, Oct. 27, 2019, pp. 33-40, XP033668402, DOI: 10.1109/ITSC.2019.8917073.
Qi et al., "Semi-parametric Image Synthesis", arXiv:1804.10992v1 [cs.CV] Apr. 29, 2018.
Ren et al., "Learning Traffic Behaviors by Extracting Vehicle Trajectories from Online Video Streams", 2018 IEEE 14th International Conference on Automation Science and Engineering (CASE), published 2018, IEEE, pp. 1276-1283.
Sarlin et al., "From Coarse to Fine: Robust Hierarchical Localization at Large Scale", rxiv.org, Cornell University Library, 201 Olin Library Cornell University Ithaca, NY 14853, Dec. 9, 2018, XP081200041.
Uricar et al., "Yes, we GAN: Applying Adversarial Techniques for Autonomous Driving", arxiv.org, Cornell University Library, 201 Olin Library Cornell University Ithaca, NY 14853, Feb. 9, 2019, XP081590898, DOI: 10.2352/ISSN.2470-1173.2019.15.AVM-048.
Wang et al., "AdvSim: Generating Safety-Critical Scenarios for Self-Driving Vehicles", 2021 IEEE/CVF Conference on Computer Vision and Pattern Recognition (CVPR).
Wang et al., "High-Resolution Image Synthesis and Semantic Manipulation with Conditional GANs", arXiv:1711.11585v2 [cs.CV] Aug. 20, 2018.
Oliveira et al., "Interpolation-and-Decimation-based Dimensionality Reduction Applied to Space-Time Processing", 2016 IEEE Sensor Array and Multichannel Signal Processing Workshop (SAM), Sep. 19, 2016, pp. 1-5.
Schuster et al., "Landmark Based Radar SLAM Using Graph Optimization", 2016 IEEE 19th International Conference on Intelligent Transportation Systems (ITSC), Nov. 1-4, 2016, pp. 2559-2564, doi:10.1109/ITSC.2016.7795967.

* cited by examiner

Algorithm 1: Landmark Extraction Method

Input: Power-range spectra $s \in \mathbb{R}^{N \times 1}$ for azimuth $a$

Output: Set of landmark detections $L(\mathbf{s})$

Parameters: Median filter width $w_{\text{median}}$; binomial filter width $w_{\text{binom}}$; z-value $z_{\mathbf{q}}$ to threshold noise; boolean $F$ and threshold $d_{\text{thresh}}$ (optional) for multipath reflection removal.

$\mathbf{q} \leftarrow \mathbf{s} - \text{medianFilter}(\mathbf{s}, w_{\text{median}})$ $\mathbf{p} \leftarrow \text{binomialFilter}(\mathbf{s}, w_{\text{binom}})$ $Q \leftarrow \{q_i : q_i \leq 0\}$ $\mathcal{N}(\mu_{\mathbf{q}}, \sigma_{\mathbf{q}}^2) \leftarrow \text{normalDistribution}(Q \cup -Q)$ Initialize $N \times 1$ vector $\hat{\mathbf{y}}$ to zeros.

for $i \leftarrow 1$ to $N$ do if $q_i > 0$ then

$\hat{y}_i \leftarrow p_i \cdot \left(1 - \frac{f(p_i|0,\sigma_{\mathbf{q}}^2)}{f(0|0,\sigma_{\mathbf{q}}^2)}\right)$ $\hat{y}_i \leftarrow \hat{y}_i + (q_i - p_i) \cdot \left(1 - \frac{f(q_i - p_i|0,\sigma_{\mathbf{q}}^2)}{f(0|0,\sigma_{\mathbf{q}}^2)}\right)$ Threshold $\hat{y}_i$ values below $z_{\mathbf{q}}\sigma_{\mathbf{q}}$.

$L(\mathbf{s}) \leftarrow \{(a, r(i)) : \hat{y}_i > 0 \cap \hat{y}_{i+1} > 0 \cap \hat{y}_{i-1} = 0\}$ If $F$, remove multipath reflections in $L(\mathbf{s})$ using $d_{\text{thresh}}$.

Fig. 4

Algorithm 2: Data Association Method

Input: Landmark sets for two scans $\mathbb{L}_1^O$, $\mathbb{L}_1^I$, $\mathbb{L}_2^O$, and $\mathbb{L}_2^I$.

Output: Set of landmark matches $\mathcal{M}(\mathbb{L}_1^O, \mathbb{L}_2^O)$.

Parameters: Percentage $\alpha$ of landmarks that, if matched, cause the algorithm to terminate.

$B \leftarrow$ unaryMatches$(\mathbb{L}_1^O, \mathbb{L}_1^I, \mathbb{L}_2^O, \mathbb{L}_2^I)$ and $W \leftarrow |B|$
$C_{W \times W} \leftarrow$ pairwiseCompatibilities$(B, \mathbb{L}_1^O, \mathbb{L}_2^O)$
$\mathbf{u}^* \leftarrow$ normalizedMaxEigenvector$(C)$
Initialize the empty set $\mathcal{M}$.
Initialize the $W \times 1$ vector *unsearched* to all *True*.
while $(any\ True\ in\ unsearched) \cap (|\mathcal{M}| < \alpha W)$ do
    $(max\_match, max\_reward) \leftarrow (i, u_i^{*2}) : u_i^{*2} \geq u_j^{*2}\ \forall\, i, j \in unsearched)$
    Terminate function if $(max\_reward \cdot W < 1)$.
    Add the match $B\{max\_ind\}$ to $\mathcal{M}$.
    $searched \leftarrow \{i : B\{max\_match, 1\} = B\{i, 1\} \cup B\{max\_match, 2\} = B\{i, 2\}\}$
    $unsearched_{i \in searched} \leftarrow False$

Fig. 8

```
function fname = create_aamir_data(fname)
    DUrban = load_aamir_data('~/Downloads/point_descriptors_urban.txt');
    DQuarry = load_aamir_data('~/Downloads/point_descriptors_quarry.txt');
    D = { [DUrban DQuarry] };
    D = D(randperm(length(D)));
    save(fname,'D')
end

function D = load_aamir_data(descriptor_file)

    fprintf('loaded Aamir data from %s\n',descriptor_file)
    a = importdata(descriptor_file);

    for i = 1: length(a)
        b = strsplit(a{i},';');
        K = zeros(length(b)-1,700);
        for j = 1:length(b)-1
            K(j,:)=str2num(b{j});
        end
        D{i} = K;
        fprintf('processed line %d of %d\n',i,length(a));
    end
end
```

Fig. 11

```
%% train_dimensionality_reduction

    %How many of Aamirs lines (300 feature sets) do we want to train on?
    training_descriptors = cat(1,D{training_scenes});
    training_descriptors = training_descriptors(:,1:new_descriptor_length);
    [projection_mean, projection_basis] = decompose(training_descriptors, ...
        num_projection_dimensions);

    save(trained_basis_fname,'projection_mean','projection_basis')
    csvwrite('trained_mean.txt',projection_mean)
    csvwrite('trained_basis.txt',projection_basis)

    fprintf('training complete\n')

    PrintToCode(projection_mean,projection_basis,"MagicalVectors.cpp")
```

Fig. 12

```
function [mu, proj,latent] = decompose(rows_of_observations, num_dim)
    mu = mean(rows_of_observations);
    shifted_observations = rows_of_observations - mu;
    P = cov(shifted_observations);
    [V,D] = eig(P);

    [latent,ind] = sort(diag(D),'descend');
    Vs = V(:,ind);

    proj = Vs(:,num_dim);
end
```

Fig. 13

SYSTEMS AND METHODS FOR LOCALIZING A RADAR SENSOR

CROSS-REFERENCE TO RELATED APPLICATIONS

The current application is U.S. National Stage of PCT Patent Application Serial No. PCT/GB2022/052651 filed Oct. 18, 2022, entitled "Method and Apparatus", which claims priority to U.K. Patent Application Serial No. 2114945.5 filed Oct. 19, 2021, entitled "Method and Computer". The disclosures of which are hereby incorporated by reference in their entireties.

FIELD

The present invention relates to localizing a radar sensor.

BACKGROUND TO THE INVENTION

In order to confidently travel through its environment, an autonomous vehicle must achieve robust localization and navigation despite changing conditions (e.g. lighting and weather) and moving objects (e.g. pedestrians and other vehicles). Currently, most platforms employ lidar, vision, GPS, internal sensors, or a combination of these systems to obtain information about their surroundings and perform motion estimation. While extremely fast and high-resolution, lidar is sensitive to weather conditions, especially rain and fog, and cannot see past the first surface encountered practical range is much lower e.g. 50-100 m. Vision systems are versatile and cheap but easily impaired by scene changes, like poor lighting or the sudden presence of adverse weather conditions e.g. snow, rain, etc. Both optical sensors only yield dependable results for short range measurements. A typical GPS provides an accuracy in the metres range and frequently experiences reception difficulties near obstructions due to its reliance on an external infrastructure. Additionally, proprioceptive sensors, like wheel encoders and IMUs, suffer from significant systematic error (i.e. drift) among other detrimental effects.

In contrast, radar is a long-range (e.g. up to 600 m), on-board system that performs well independent of lighting conditions and under a variety of weather conditions, and it is more affordable and efficient than lidar. Due to its relatively long wavelength, radar can penetrate and see through certain materials, which allows it to return multiple readings from the same transmission and generate a grid representation of the environment. As a result, radar sensors detect stable, long-range features in the environment.

However, conventional methods of radar localization and odometry do not provide sufficiently accurate and/or precise localization, for example pose estimation, such as for path planning. Typically, navigation is more high-level referring to "go to place X" while path planning is more low level and refers to defining an exact path for the vehicle to traverse. More generally, traditional approaches for radar odometry and localization are not of sufficient accuracy or robustness for precise pose estimation for the purposes of accurate odometry or large-scale localization for vehicles, such as autonomous vehicles and more generally, landcraft or watercraft.

There is demand for a radar-only localization and odometry system in many applications, for example mining and off-road environments. These applications require deploying and running a radar localization and odometry system on low powered hardware with limited compute resources. An example of such a radar localization and odometry system comprises a Navtech CTS350-X sensor (available from Navtech Radar Limited, UK), which has an available compute of 1.6 GHz quad-core ARM A53 processor with close to 1 W power draw. Conventional radar localization and odometry systems are too slow to be practicable on this type of a low specification compute platform, for example for controlling vehicles, such as autonomous vehicles and more generally, landcraft or watercraft, in real time.

Hence, there is a need to improve localizing of radar sensors.

SUMMARY OF THE INVENTION

It is one aim of the present invention, amongst others, to provide method of localizing a radar sensor which at least partially obviates or mitigates at least some of the disadvantages of the prior art, whether identified herein or elsewhere. For instance, it is an aim of embodiments of the invention to provide a method of localizing a radar sensor that provides sufficiently accurate and/or precise localization, for example pose estimation, such as for navigation. For instance, it is an aim of embodiments of the invention to provide a reliable and accurate radar only system for precise odometry and localization pose estimation. For instance, it is an aim of embodiments of the invention to provide a method of localizing a radar sensor implemented by a relatively-low specification compute platform while providing control of vehicles, such as autonomous vehicles and more generally, landcraft or watercraft, in real time. For instance, it is an aim of embodiments of the invention to provide a fast and efficient implementation for low power embedded platforms.

A first aspect provides a computer-implemented method of localizing a radar sensor, the method comprising:

- obtaining a first radar scan of a first environment of the radar sensor, wherein the first radar scan comprises a set of power-range spectra, including a first power-range spectrum;
- extracting a first set of landmarks, including a first landmark, from the first radar scan, wherein the first landmark is defined by a range and an azimuth;
- computing a respective first set of descriptors, including a first descriptor, of the first set of landmarks, wherein the first descriptor defines the first landmark by respective relative ranges and azimuths in relation to one or more landmarks included in the first set of landmarks;
- accessing one or more reference sets of landmarks of respective environments and computing respective reference sets of descriptors of the reference sets of landmarks;
- matching the first set of descriptors to a corresponding first reference set of descriptors; and
- localizing a first location of the radar sensor using a first result of the matching.

The term "descriptor" may be understood to mean a vector including elements defining positions of points of a radar point cloud of features detected with reference to an origin. The origin may be a radar sensor that has captured the radar scan that detected the descriptor.

The first landmark from the first set of landmarks may equate to at least one landmark from the first set of landmarks. The at least one landmark may be an arbitrarily selected landmark from the first set of landmarks.

A second aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein matching the first set of descriptors to the corresponding first reference set of descriptors comprises projecting the first descriptor to a first projected descriptor.

Projecting the first descriptor to a first projected descriptor may comprise reducing a dimension of the first descriptor to a size of the first projected descriptor. In spite of the dimensionality reduction, the first descriptor and the first projected descriptor may be 1 dimensional vectors.

A third aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks; accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

projecting the first descriptor to a first projected descriptor, wherein the first descriptor has a dimensionality N and the first projected descriptor has a dimensionality M, wherein M≠N; and wherein matching the first set of descriptors to the corresponding first reference set of descriptors comprises matching a first set of projected descriptors, including the first projected descriptor, to the corresponding first reference set of descriptors of the plurality of sets of descriptors.

A fourth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

computing one or more values in response to a request, storing the computed one or more values and returning the stored one or more values or one or more values derived therefrom in response to a subsequent request.

A fifth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

simultaneously computing two or more values and/or relationally computing using two or more values.

A sixth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

representing the first set of landmarks as a first signature;

representing the reference sets of landmarks as respective reference signatures; and correlating the first signature and a reference signature, thereby approximating the first location of the radar sensor.

The term "signature" may be understood to mean a vector including a plurality of values, each value corresponding to a count of a number of features within an annular segment of a radar scan.

A seventh aspect provides a computer-implemented method of controlling a landcraft or a watercraft comprising a radar sensor, the method comprising:

localizing the radar sensor according to the first aspect, the second aspect, the third aspect, the fourth aspect, the fifth aspect and/or the sixth aspect; and controlling the landcraft or the watercraft using the first location.

An eighth aspect provides a computer comprising a processor and a memory configured to perform a method according to the first aspect, the second aspect, the third aspect, the fourth aspect, the fifth aspect, the sixth aspect and/or the seventh aspect.

A ninth aspect provides a computer program comprising instructions which, when executed by a computer comprising a processor and a memory, cause the computer to perform a method according to the first aspect, the second aspect, the third aspect, the fourth aspect, the fifth aspect, the sixth aspect and/or the seventh aspect.

A tenth aspect provides a non-transient computer-readable storage medium comprising instructions which, when executed by a computer comprising a processor and a memory, cause the computer to perform a method according to the first aspect, the second aspect and/or the third aspect.

An eleventh aspect provides a landcraft or a watercraft comprising a radar sensor and a computer according to the eighth aspect.

DETAILED DESCRIPTION OF THE INVENTION

According to the present invention there is provided a method of localizing a radar sensor, as set forth in the appended claims. Also provided is a method of controlling a landcraft or a watercraft. Other features of the invention will be apparent from the dependent claims, and the description that follows.

Localizing a Radar Sensor

The first aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching.

In this way, the radar sensor is localized sufficiently accurately and/or precisely, for example for navigation of a landcraft or a watercraft, since the radar sensor is localized by matching the first set of descriptors to the corresponding first reference set of descriptors, for example provided by mapping the environment, thereby providing a reliable and accurate radar only system for precise odometry and localization pose estimation, for example. Furthermore, since the radar sensor is localized by matching the first set of descriptors to the corresponding first reference set of descriptors, the method may be implemented by a relatively-low specification compute platform while providing control of a landcraft or a watercraft in real time, thereby providing a fast and efficient implementation for low power embedded platforms, for example.

The method is a computer-implemented method. Suitable compute platforms (i.e. a computer comprising a processor and a memory) are known, for example based on a 1.6 GHz quad-core ARM A53 processor with close to 1 W power draw, or similar. In one example, the method is implemented on a computer having at most a 5 W, preferably at most a 3 W, more preferably at most a 1 W power draw.

The method is of localizing (also known as localization), for example estimating a geographic position such as represented by GPS coordinates and/or orientation, for example to within (accuracy?) and is a term of the art.

Suitable radar sensors, for example millimeter-wave radar sensors, are known. For example, the Navtech CTS350-X is a frequency-modulated continuous-wave (FMCW) scanning radar without Doppler information, that returns 399 azimuth and 2000 range readings with a 0.25 m range resolution and has a beam spread of 2 degrees in azimuth and 25 degrees in elevation of beginning at just below the horizontal. Typically, the radar sensor is placed on the roof of a ground vehicle (also known as landcraft) or a watercraft, with an axis of rotation perpendicular to the driving plane.

The method comprises obtaining the first radar scan of the first environment of the radar sensor, wherein the first radar scan comprises the set of power-range spectra, including the first power-range spectrum (i.e. at least one power-range spectrum). It should be understood that the first environment of the radar sensor is the surroundings in which the radar sensor operates, for example on road, off road, an industrial facility such as mining operations, on water, and is a term of the art. Radar scans are typically represented as a set of power-range spectra (i.e. 1D signals), for example one for each azimuth, and each power-spectrum may be represented by an array of values or a vector $s(t) \in \mathbb{R}^{N \times 1}$. Other representations are known. In one example, the set of power-range spectra includes P power range spectra, wherein P is a natural number greater than or equal to 1, for example 1, 30, 60, 90, 120, 180, 360, 399, 720, 1080, 1440 or more. Increasing P increases azimuthal resolution while increases processing. In one example, obtaining the first radar scan of the first environment of the radar sensor comprises acquiring (also known as capturing), by the radar sensor, the first radar scan of the first environment, for example in real-time (i.e. while a landcraft or a watercraft comprising the radar sensor is moving through the first environment).

The method comprises extracting the first set of landmarks, including the first landmark (i.e. at least one landmark), from the first radar scan (also known as radar data or raw radar scene data), wherein the first landmark is defined by a range and an azimuth. This step is also known as landmark extraction. Processes of landmark extraction are known and an example process of landmark extraction is described with reference to FIGS. 3 and 4. Typically, a landmark is a static and/or invariant feature (also known as an object) in an environment and is a term of the art. Typically, a landmark is defined by a range and an azimuth in this technical field. In one example, the first set of landmarks includes L landmarks, wherein L is a natural number greater than or equal to 1, for example 1, 2, 3, 4, 5, 6, 7, 8, 9, 10, 20, 30, 40, 50, 100, 200, 500 or more. In one example, extracting the first set of landmarks, including the first landmark, from the first radar scan comprises using a sliding or moving window mean filter, for example instead of a sliding or moving window median filter, thereby improving computing speed due to reduced operations, without apparent change in quality of extracted landmarks. In one example, extracting the first set of landmarks, including the first landmark, from the first radar scan comprises using non-maximal suppression. For example, in an area of relatively high radar reflectivity, multiple reflections may give rise to multiple detections at different ranges. Non-maximal suppression may be used to remove or prune out such repeating patterns.

The method comprises computing a respective first set of descriptors (also known as scene point descriptors), including a first descriptor, of the first set of landmarks, wherein the first descriptor defines the first landmark by respective relative ranges and azimuths in relation to one or more landmarks included in the first set of landmarks. This step is also known as a first sub-step of pose estimation. It should be understood that the descriptors are unary descriptors of the respective landmarks and define the mutual relationships between the landmarks. In one example, the first descriptor is represented as a vector of values that uniquely describes the first landmark. In this way, the landmark may be identified and matched in other radar scans. In one example, the first descriptor specifies the first landmark by radial statistics of neighbouring landmarks, for example both in range and azimuth. Processes of computing descriptors are known and an example process of computing descriptors is described with reference to FIG. 5.

The method comprises accessing one or more reference sets of landmarks of respective environments and computing respective reference sets of descriptors of the reference sets of landmarks. It should be understood that the reference sets of landmarks comprise and/or are a landmark map, such as archived in a landmark database, and are extracted from radar scans previously acquired by the radar sensor and/or by another radar sensor and hence provide known references for localizing the radar sensor.

The method comprises matching the first set of descriptors to the corresponding (i.e. best matching) first reference set of descriptors. This step is also known as a second sub-step of pose estimation and is known as data association. In one example, matching the first set of descriptors to the corresponding first reference set of descriptors comprises aligning the first set of descriptors and the first reference set of descriptors and estimating a difference therebetween. In one example, matching the first set of descriptors to the corresponding first reference set of descriptors comprises aligning the first set of descriptors and the respective reference sets of descriptors, for example each of the reference sets of descriptors, estimating respective differences therebetween and selecting the corresponding first reference set of descriptors as having the smallest difference. Processes of matching are known and an example process of matching is described with reference to FIGS. 6, 7 and 8.

The method comprises localizing the first location of the radar sensor using the first result of the matching. In this way, the first location of the radar sensor is localized relative to the corresponding (i.e. best matching) first reference set of descriptors.

Odometry

In one example, the method comprises:

- obtaining a second radar scan of the first environment of the radar sensor;
- extracting a second set of landmarks, including a first landmark, from the second radar scan; computing a respective second set of descriptors, including a first descriptor, of the second set of landmarks;
- matching the second set of descriptors to a corresponding second reference set of descriptors;
- localizing a second location of the radar sensor using a second result of the matching; and
- calculating a motion of the radar sensor using the second location and the first location.

In this way, the motion (for example velocity) of the radar sensor is calculated using the second location and the first location and (implicitly) respective times of the second radar scan and the first radar scan.

In one example, the method comprises repeatedly, for example periodically or intermittently, obtaining radar scans of the first environment of the radar sensor and repeatedly calculating the motion of the radar sensor mutatis mutandis.

Efficiency

The method according to the first aspect is suitable for implementation by low power compute platforms. Particularly, the method optionally comprises algorithms implemented in a highly optimised way that enables running on low power compute platforms, as described below.

Dimensionality Search

In one example, matching the first set of descriptors to the corresponding first reference set of descriptors comprises projecting the first descriptor to a first projected descriptor. In one example, matching the first set of descriptors to the corresponding first reference set of descriptors comprises projecting the first set of descriptors to a respective first set of projected descriptors. In one example, matching the first set of descriptors to the corresponding first reference set of descriptors comprises projecting the first reference set of descriptors to a respective first reference set of projected descriptors. In one example, matching the first set of descriptors to the corresponding first reference set of descriptors comprises comparing a first set of projected descriptors, including the first projected descriptor, with a corresponding first reference set of projected descriptors.

The method comprises matching the first set of descriptors to the corresponding (i.e. best matching) first reference set of descriptors. Preferably, the method provides a faster and more efficient search for matching descriptors from one scan to another. For example, given a point descriptor of a landmark in scanA, the search is for the best matching point descriptor (and hence landmark) in scanB. A conventional approach is to perform a full compare against every landmark in scanB for each landmark in scanA. However, such a conventional approach results in a quadratic algorithm which is slow and doesn't scale well with the number of descriptors in each set. The inventors have developed two specific techniques for matching the first set of descriptors to the corresponding first reference set of descriptors: Eigen projection and distance projection.

Eigen Projection

In one example, matching the first set of descriptors to the corresponding first reference set of descriptors comprises projecting the first descriptor to a first Eigen projected descriptor, wherein the first descriptor has a dimensionality n>1 and the first projected Eigen descriptor has a dimensionality $n_p=1$. In this way, a faster search is achieved by projecting the first descriptor to a lower dimensional space so there are fewer comparisons and reduced computation. In more detail, the first set of descriptors is projected into a smaller dimensional space to make them easier (less comparisons and operations) and faster to compare, thereby improving the speed of the unary candidate matching where points in one scan are matched to the best matches in the other scan.

For example:

Input=take a descriptor (which is n-dimensional e.g. 700-d) and project it into a much smaller (a 1D space) specified by a projection direction.

Output=for a given point descriptor in scan A the output is the M closest point descriptors in scan B.

In one example, matching the first set of descriptors to the corresponding first reference set of descriptors comprises comparing a first set of Eigen projected descriptors, including the first Eigen projected descriptor, with a corresponding first reference set of Eigen projected descriptors. In this way, the first reference set of descriptors are similarly projected such that both the first set of Eigen projected descriptors and the first reference set of Eigen projected descriptors have a dimensionality $n_p=1$.

In one example, comparing the first set of Eigen projected descriptors, including the first Eigen projected descriptor, with the corresponding first reference set of Eigen projected descriptors comprises identifying M closest Eigen projected descriptors of the corresponding first reference set of Eigen projected descriptors. It should be understood that M is a natural number, greater than or equal to 1 and less than the number of Eigen projected descriptors included in the first reference set of Eigen projected descriptors i.e. a subset of the first reference set of Eigen projected descriptors is identified. In this way, a reduced number of closest Eigen projected descriptors are identified for subsequent matching, thereby improving an efficiency.

In more detail, the descriptor projection may also be described as follows.

Files that were used as input to the script were:

point_descriptorrs_urban.txt; and point_descriptors_quarry.txt

Both files contain point descriptors of radar landmark scenes (landmarks extracted from the raw scan) in a text readable format.

The format of the files was a scan on each line with the point descriptor for each point in a scan separated by a semi-colon. So, a file of 20 scans was 20 lines long. If each scene has 600 points, then there will be 599 (600-1) semi-colons per line to separate the 600-point descriptors. If 700-dimensional point descriptors were used, then there will be 700 comma-separated numbers between two semi-colons on a line. Thus, there would be 420,000 (600 points*700 descriptors) values per line.

S1PD1; S1PD2; S1PD3; . . . ; S1PD600;
S2PD1; S2PD2; S2PD3; . . . ; S2PD600;
. . .
S19PD1; S19PD2; S19PD3; . . . ; S19PD600;
S20PD1; S20PD2; S20PD3; . . . ; S20PD600;

In the above, S corresponds to a scan number and PD corresponds to a point descriptor for that scan.

FIG. 11 shows code used to read the text files.

Matlab's strsplit script is used to read in the text file of scans with delimited point descriptors of points in each scene.

K is a matrix (originally of zeros) of size rows×cols where rows=number of points in each scan cols=700 (size of the point descriptor). K is populated by converting strings to their number representation.

D is the collection of scans where, D{i} is the matrix of point descriptors for scan i (which corresponds to line i in the text file). DUrban may be a collection of scans from point_descriptorrs_urban.txt. DQuarry may be a collection of scans from point_descriptors_quarry.txt.

DUrban and DQuarry are concatenated into D and then a rendom permutation of the integers is made. This can be achieved by running randperm to mix up all the scans.

The full set of scans is partitioned into training scenes (about 80% of the scans) and testing (about 20% of the scans). Matlab's cat function may be used to concatenate the training scenes together along axis 1. This means the matrices are vertically appended on top of each other so the number of columns is still equal to point descriptor size and rows will now be points_per_scan*number of scans in training set.

FIG. 12 shows code used to compute trained_mean and trained_basis.

We then call decompose—which does all the heavy lifting to compute the trained_mean and trained_basis.

[projection_mean, projection_basis]=decompose(training_descriptors, num_projection_dimensions);

(Where num_projection_dimensions is the number of dimensions to be projected to. Here it's 1)

FIG. 13 shows code used to reduce a dimension of a matrix.

Matlab's mean function is used to obtain a vector of the mean of each element of the point descriptor. This is later saved as the trained_mean. For example, if A is a matrix, then mean(A) returns a row vector containing the mean of each column. This mean is then used to shift every point descriptor (shifted_observations).

Matlab's cov function is used, e.g. C=cov(A) returns the covariance. If A is a matrix whose columns represent random variables and whose rows represent observations, C is the covariance matrix with the corresponding column variances along the diagonal. In other words, for a matrix A, whose columns are each a random variable made up of observations, the covariance matrix is the pairwise covariance calculations between each column combination. This can be expressed as C(I,j)=cov(A(:,i),A(:,j)).

It is important to note that to build the covariance matrix, the descriptor vectors themselves are used. In other words, descriptor elements themselves are used as the signals. This is different to prior art methods where differences have been used instead. Using descriptor elements per se results in a method that is much easier to train.

Given all the observations, the covariances are computed of all the point descriptor variables with respect to each other. For example, a covariance matrix P is generated by using P=cov(shifted_observations).

We then use eig to compute the eigenvalues and eigenvectors of the covariance matrix. This can be described as [V,D]=eig(A) returns diagonal matrix D of eigenvalues and matrix V whose columns are the corresponding right eigenvectors, so that A*V=V*D.

Then, the eigenvalues are sorted in descending order. This can be described in two stages. In a first stage, B=sort(A, direction) is used to sort elements of A in the order specified by direction using any of the previous syntaxes. 'ascend' indicates ascending order (the default) and 'descend' indicates descending order. In a second stage, [B,I]=sort(_) is used to return a collection of index vectors for any of the previous syntaxes. I is the same size as A and describes the arrangement of the elements of A into B along the sorted dimension. For example, if A is a vector, then B=A(I).

The principle eigenvectors are then taken for the number of dimensions N that are to be reduced down to, i.e. the eigenvectors corresponding to the top N eigenvalues after the sort. In this case, the reduction is to a single dimension and so the eigenvector corresponding to the largest eigenvalue is taken. This single largest eigenvalue is the basis vector.

It is important to note that dimensionality reduction in this way is a means to "summarize" or "compress" the descriptor to make it easier to compare and match to other descriptors as a first-step of the matching process to reduce the search space and speed up the whole data association process. This is different to prior art methods where dimensionality reduction has been used to filter out dimensions that do not give information about whether or not a match is a match or a non-match.

By using dimensionality reduction in this way, it is possible to reduce the dimensions of the point descriptors themselves to speed up the process of matching one point descriptor to those in another scan.

Importantly, with reference to training the basis vectors, the present subject-matter provides a method of training on and generating a basis vector, or principle eigenvector, from sampled point descriptors themselves.

Distance Projection

In one example, matching the first set of descriptors to the corresponding first reference set of descriptors comprises identifying M closest descriptors of the corresponding first reference set of descriptors and finding the single closest descriptor from amongst the M closest descriptors.

In one example, the method comprises:

- summing a first absolute difference between the first set of descriptors and a first reference set of descriptors and setting a threshold absolute difference as the summed (i.e. total) first absolute difference; and
- summing a second absolute difference between the first set of descriptors and a second reference set of descriptors, while the summing (i.e. running total) second absolute difference is at most the threshold absolute difference;
- if the summing second absolute difference exceeds the threshold absolute difference, stop summing the second absolute difference and start summing a third absolute difference between the first set of descriptors and a third reference set of descriptors;
- else if the summed second absolute difference does not exceed the threshold absolute difference, resetting the threshold absolute difference as the summed second absolute difference.

In this way, the processing bails out early based on a running distance metric (i.e. a summing absolute difference), which is the sum of absolute differences (also known as L1-norm), thereby providing faster search by reducing the search space based on distance. In other words, the method gives up on or moves on from descriptors that are already showing a larger sum of absolute differences (SAD) than our current best candidate (i.e. the reference set of descriptors for which the end threshold absolute difference was set or reset). This process may be known as a distance trick.

For example:

Input=for a given point descriptor in scan A, the M closest point descriptors in scan B.

Output=the single closest (by L1-norm) point descriptor from the set M of descriptors.

Because of the distance trick, this computation (finding the closest descriptor) is much faster and more efficient.

In one example, the method comprises ordering (also known as sorting) the reference sets of descriptors by likelihood of match, for example by decreasing likelihood of match. In this way, by ordering candidates by likelihood of match, this will be a big saving as we will look at the most likely and hence lowest SAD dFsubstescriptors first.

Descriptor Resizing

In one example, the method comprises:

- projecting the first descriptor to a first projected descriptor, wherein the first descriptor has a dimensionality N and the first projected descriptor has a dimensionality M, wherein M≠N; and wherein matching the first set of descriptors to the corresponding first reference set of descriptors comprises matching a first set of projected descriptors, including the first projected descriptor, to the corresponding first reference set of descriptors of the plurality of sets of descriptors.

In this way, the first descriptor is resized (i.e. projected) to a larger or a smaller dimensionality M, rather than re-computing the first descriptor to the larger or the smaller dimensionality M. Smooth descriptor resizing for speed control=the ability to resize (i.e rescale) the radar point descriptors to enable the system to convert an existing computed descriptor to larger or smaller size, rather than recomputing the descriptor. The implementation or way in which we do this is good.

For example:

Input=a point descriptor of size N e.g. 700. (i.e. a vector of size N.)

Output=the equivalent point descriptor of size M e.g. 400. (i.e. a vector of size M.)

In one example, projecting the first descriptor to the first projected descriptor comprises interpolating elements thereof. In this way, the dimensionality M is increased.

In one example, projecting the first descriptor to the first projected descriptor comprises averaging or dropping elements thereof. In this way, the dimensionality M is decreased.

Storing Computed Values

In one example, the method comprises computing one or more values in response to a request, storing the computed one or more values and returning the stored one or more values or one or more values derived therefrom in response to a subsequent request.

The inventors have developed techniques for further optimizing computing, particularly for low powered hardware with limited compute resources. The inventors have developed two specific techniques for reducing or minimizing repeating of computations: caching and use of look up tables.

Caching

In one example, the one or more values comprises and/or is the set of descriptors and computing the one or more values comprises computing the set of descriptors. In one example, the one or more values comprises and/or is the reference sets of descriptors and computing the one or more values comprises computing the reference sets of descriptors.

In one example, the method comprises storing the reference sets of descriptors; and wherein matching the first set of descriptors to the corresponding first reference set of descriptors comprises matching the first set of descriptors to the corresponding first set of descriptors of the stored reference sets of descriptors.

In this way, the descriptors are cached (i.e. stored) for later use, thereby avoiding recomputing the descriptors and hence improving an efficiency.

For example, for a particular radar scan e.g. the latest live scan from the radar sensor, the outputs and/or intermediaries (i.e. calculated values) of computing (generally, calculating) for that that particular radar scan are stored such that:

1. the method only calculates values once and then reuses the calculates values which means the method does not repeat the same calculations.

2. the method caches all the calculated values for the particular scan together in one instance of a software object.

For example:

Input=a point cloud of the landmarks extracted from a radar scan.

Output=RadarSceneData object containing the scan and all computations conducted by it—including the point descriptors which is a matrix of values—each column is the point descriptor for a point, so the matrix is N×M, where N is the dimensionality of the point descriptors and M is the number of points in a radar landmark scan.

In more detail, the following are required data.

A landmarks point cloud which is a point cloud data of the 3d positions of the landmarks. This may be provided in the form of live or map point clouds of landmarks.

A sampling mask vector defining a mask to be used by a sampling policy to select landmarks in the point cloud to return. The sampling mask vector may be built using user defined sampling policies.

A descriptor template which includes trained and basis vectors used to project the full point descriptors in the scene down to a lower dimensional space for quicker searching. This is trained and provided.

The following may be computed from the required data. The computed data may then be cached/stored for efficiency and re-use later.

An Eigen 3D matrix of x,y,z positions of landmarks in the scene. This is more convenient as an eigen type for other computations.

A matrix of point-to-point distances, i.e. the distance from each point to every other point. This is needed for the point descriptor computations later. This is computed from the landmarks point cloud.

A matrix of angles between points. The angles may be computed using a graphical processing unit (GPU). The angles may be angles from each point to every other point, and these angles may be used for point descriptor computations. These angles may be computed from the landmarks point cloud.

A point descriptors matrix, which is a matrix of point descriptors of a scene. The matrix may be computed from the landmarks of the point cloud.

A scene descriptors vector, which is a vector of the scene descriptors projected to a lower dimensionality space (e.g. 1D) by the trained basis vector. This makes it easy to reduce the search space when matching point descriptors between scenes as there may be only a 1D search initially to get the reduced set to search more thoroughly. The scene descriptors vector may be computed by using the descriptor template and the computed point descriptors matrix.

A range vector, which is ranges of points in the landmarks point cloud. The range vector can be computed from the landmarks point cloud.

Look Up Tables

In one example, the method comprises computing one or more values in response to a request, storing the computed one or more values and returning the stored one or more values or one or more values derived therefrom in response to a subsequent request.

In one example, the one or more values comprises and/or is the set of descriptors and/or intermediate values thereof and storing the computed one or more values comprises storing the computed one or more values in a set of lookup tables, including a first lookup table.

In one example, computing the first set of descriptors, including the first descriptor, of the first set of landmarks uses a set of lookup tables, including a first lookup table.

In this way, lookup tables (i.e. precalculated lookup tables) are used for complex functions, thereby eliminating the need to repeatedly compute complex functions. This is more efficient and provides a large speed up.

In one example, the method comprises generating the first lookup table at compile time (i.e. when compiling, during compilation) and using the first lookup table at runtime (i.e. when executing, during running).

For example, an "ArcCosineApproximator" class may be used when computing descriptors, providing a fast look up solution for 'acos'. The lookup table is generated at compile time, using a quotient of two polynomials to approximate 'acos', and the lookup table used at runtime.

In one example, the method comprises generating the first lookup table at runtime upon the first calculation of a given value thereof.

Processing

In one example, the method comprises simultaneously computing two or more values and/or relationally computing using two or more values.

The inventors have developed techniques for further optimizing computing, particularly for low powered hardware with limited compute resources. The inventors have developed two specific techniques for accelerating and/or simplifying computations: parallel processing and use of triangulation.

Parallel Processing

In one example, computing the first set of descriptors, including the first descriptor, of the first set of landmarks comprises parallel processing, for example using single instruction, multiple data (SIMD), of the first set of landmarks.

In this way, the method optimises use of available hardware, improving speed and efficiency. For example, the first set of descriptors of the first set of landmarks may be computed in parallel, since the same instruction is being applied thereto.

For example:

Input=a point cloud of the landmarks extracted from a radar scan. M is the number of points in a radar landmark scan.

Output=Radar point descriptors which is a matrix of values—each column is the point descriptor for a point, so the matrix is N×M, where N is the dimensionality of the point descriptors and M is the number of points in a radar landmark scan.

Triangulation

In one example, computing the first set of descriptors, including the first descriptor, of the first set of landmarks comprises triangulating the first landmark with respect to a respective node and a landmark of the first set of landmarks. In this way, an efficiency is increased.

In one example, triangulating the first landmark with respect to the respective node and the landmark of the first set of landmarks comprises using the cosine rule (also known as the law of cosines cosine formula or al-Kashi's theorem), for example as described with reference to FIG. 9.

Signatures

In one example, the method comprises:

representing the first set of landmarks as a first signature;

representing the reference sets of landmarks as respective reference signatures; and correlating the first signature and a reference signature, thereby approximating the first location of the radar sensor.

In this way, by correlating the first signature and a reference signature, the first location of the radar sensor is approximated at a relatively lower accuracy before subsequently localizing the first location of the radar sensor at a relatively higher accuracy using the respective reference set of landmarks represented by the correlated reference signature. In other words, this provides a first pass approximation of the first location, for subsequent refinement, identifying generally the location of the first sensor on a map.

In more detail, the radar signature functionality provides a method for finding loop closures using radar sensor data (i.e. radar scans), for example to identify a map node to localize against when initialising or when the localization becomes lost. Whilst external sources can be used for this, the advantage of the radar signatures is that they only require radar data, and so remove dependencies on other sensor modalities.

It should be understood that a radar signature (i.e. a signature) is a highly compact representation of a radar landmarks point cloud. The plane around the radar is split up into a set of regions in a polar representation originating from the radar itself. Points are assigned to a corresponding two dimensional histogram, which has bins for combinations of distance (i.e. range) and angle (i.e. azimuth). This histogram is normalised to sum to one.

Two signatures are compared using the complement of the histogram intersection metric as the measure of similarity. This gives a value of zero for the best possible match. The best candidate node to initialise against in the map can be chosen as the one with the lowest score with the current radar sensor data (given that both have been converted to signature representation). All the signatures for each map node can be computed at start up, so the algorithm is fast enough to locate best matching node in a fraction of a second.

The signature_similarity_threshold threshold is the maximum similarity measure allowed for the best candidate node, otherwise the algorithm will report no suitable map node found. The remaining parameters control the structure of the set of regions used to derive the histogram. This is a disc with the radar at the centre with radius equal to signature_max_range. This disc is divided up into regions radiating out from the centre defined by signature_num_angle_bins and signature_num_range_bins. The resulting histogram will thus have a total number of bins equal to the product of the signature_num_angle_bins and signature_num_range_bins.

In one example, accessing the reference sets of landmarks comprising selectively accessing the reference set of landmarks represented by the reference signature.

Landcraft or Watercraft

In one example, a landcraft or a watercraft comprises the radar sensor.

In one example, the landcraft or the watercraft is an unmanned, semi-autonomous and/or autonomous landcraft or watercraft. Generally, an unmanned craft (also known as an uncrewed craft) is a craft without a human on board. An unmanned craft can either be a remote controlled craft, a semi-autonomous craft or an autonomous vehicle, capable of sensing its environment and navigating autonomously. Unmanned craft include unmanned ground vehicles (UGVs), such as autonomous cars, and unmanned surface vehicles (USV), for the operation on the surface of the water.

Typically, landcraft (also known as vehicles) include military, commercial and/or personal landcraft. Military vehicles include combat vehicles and transport vehicles, such as military ambulances, amphibious military vehicles, armoured fighting vehicles, electronic warfare vehicles, military engineering vehicles, improvised fighting vehicles, Joint Light Tactical Vehicles, military light utility vehicles, off-road military vehicles, reconnaissance vehicles, recovery vehicles, self-propelled weapons, self-propelled anti-aircraft weapons, self-propelled artillery, tanks, tracked military vehicles, half-tracks, military trucks and wheeled military vehicles. Commercial vehicles include trucks (such as box trucks, articulated lorries, vans), buses and coaches, heavy equipment (such as used in mining, construction and farming), and passenger vehicles such as taxis. Personal landcraft include cars and trucks. Other landcraft are known.

Typically, watercraft include military, merchant and/or pleasure watercraft, including surface watercraft. Military watercraft classes include: aircraft carriers; cruisers; destroyers; frigates; corvettes; large patrol vessels; minor surface combatants such as missile boats, torpedo boats and patrol boats including rigid inflatable boats (RIBs); mine warfare vessels such as mine countermeasures vessels; minehunters; minesweepers and minelayers; amphibious warfare vessels such as amphibious assault ships; dock landing ships; landing craft and landing ships; air-cushioned landing craft. Merchant watercraft classes include: container ships; bulk carriers; tankers; passenger ships such as ferries and cruise ships; coasters; and specialist ships such as anchor handling vessels, supply vessels, tugs, salvage vessels, research vessels, fishing trawlers and whalers. Pleasure (also known as recreational) watercraft classes include boats and yachts such as pontoons, bowriders, cabin cruisers, houseboats, trawlers, motor yachts and catamarans. Other watercraft are known.

Dimensionality Search

The second aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein matching the first set of descriptors to the corresponding first reference set of descriptors comprises projecting the first descriptor to a first projected descriptor.

The method according to the second aspect may be as described with respect to the first aspect mutatis mutandis and may include any step described with respect to the first aspect.

Descriptor Resizing

The third aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

projecting the first descriptor to a first projected descriptor, wherein the first descriptor has a dimensionality N and the first projected descriptor has a dimensionality M, wherein M≠N; and wherein matching the first set of descriptors to the corresponding first reference set of descriptors comprises matching a first set of projected descriptors, including the first projected descriptor, to the corresponding first reference set of descriptors of the plurality of sets of descriptors.

The method according to the third aspect may be as described with respect to the first aspect mutatis mutandis and may include any step described with respect to the first aspect.

Storing Computed Values

The fourth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

computing one or more values in response to a request, storing the computed one or more values and returning the stored one or more values or one or more values derived therefrom in response to a subsequent request.

The method according to the fourth aspect may be as described with respect to the first aspect mutatis mutandis and may include any step described with respect to the first aspect.

Processing

The fifth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

simultaneously computing two or more values and/or relationally computing using two or more values.

The method according to the fifth aspect may be as described with respect to the first aspect mutatis mutandis and may include any step described with respect to the first aspect.

Signatures

The sixth aspect provides a computer-implemented method of localizing a radar sensor, the method comprising:

obtaining a first radar scan of a first environment of the radar sensor, wherein the first radar scan comprises a set of power-range spectra, including a first power-range spectrum;

extracting a first set of landmarks, including a first landmark, from the first radar scan, wherein the first landmark is defined by a range and an azimuth;

computing a respective first set of descriptors, including a first descriptor, of the first set of landmarks, wherein the first descriptor defines the first landmark by respective relative ranges and azimuths in relation to one or more landmarks included in the first set of landmarks;

accessing one or more reference sets of landmarks of respective environments and computing respective reference sets of descriptors of the reference sets of landmarks;

matching the first set of descriptors to a corresponding first reference set of descriptors; and localizing a first location of the radar sensor using a first result of the matching;

wherein the method further comprises:

representing the first set of landmarks as a first signature;

representing the reference sets of landmarks as respective reference signatures; and correlating the first signature and a reference signature, thereby approximating the first location of the radar sensor.

The method according to the sixth aspect may be as described with respect to the first aspect mutatis mutandis and may include any step described with respect to the first aspect.

Controlling a Landcraft or a Watercraft

The seventh aspect provides a computer-implemented method of controlling a landcraft or a watercraft comprising a radar sensor, the method comprising:

localizing the radar sensor according to the first aspect, the second aspect, the third aspect, the fourth aspect, the fifth aspect and/or the sixth aspect; and controlling the landcraft or the watercraft using the first location.

In this way, the landcraft or the watercraft is controlled using the first location, for example for navigation. The landcraft or the watercraft may be as described with respect to the first aspect.

In one example, controlling the landcraft or the watercraft using the first location comprises controlling the landcraft or the watercraft responsive to the first location.

In one example, controlling the landcraft or the watercraft using the first location comprises navigating the landcraft or the watercraft.

In one example, controlling the landcraft or the watercraft using the first location comprises semi-autonomously or autonomously controlling the landcraft or the watercraft using the first location.

Computer, Computer Program, Non-Transient Computer-Readable Storage Medium

The eighth aspect provides a computer comprising a processor and a memory configured to perform a method according to the first aspect, the second aspect, the third aspect, the fourth aspect, the fifth aspect, the sixth aspect and/or the seventh aspect.

The ninth aspect provides a computer program comprising instructions which, when executed by a computer comprising a processor and a memory, cause the computer to perform a method according to the first aspect, the second aspect, the third aspect, the fourth aspect, the fifth aspect, the sixth aspect and/or the seventh aspect.

The tenth aspect provides a non-transient computer-readable storage medium comprising instructions which, when executed by a computer comprising a processor and a memory, cause the computer to perform a method according to the first aspect, the second aspect and/or the third aspect.

Landcraft or Watercraft

The eleventh aspect provides a landcraft or a watercraft comprising a radar sensor and a computer according to the eighth aspect.

The landcraft or the watercraft may be as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIG. 4 is an example of an algorithm of landmark extraction for the method of FIG. 2;

FIG. 8 is an example of an algorithm of data association for the method of FIG. 2;

FIGS. 11 to 13 show code used in certain embodiments of the present disclosure.

DETAILED DESCRIPTION OF THE DRAWINGS

Figure 1:
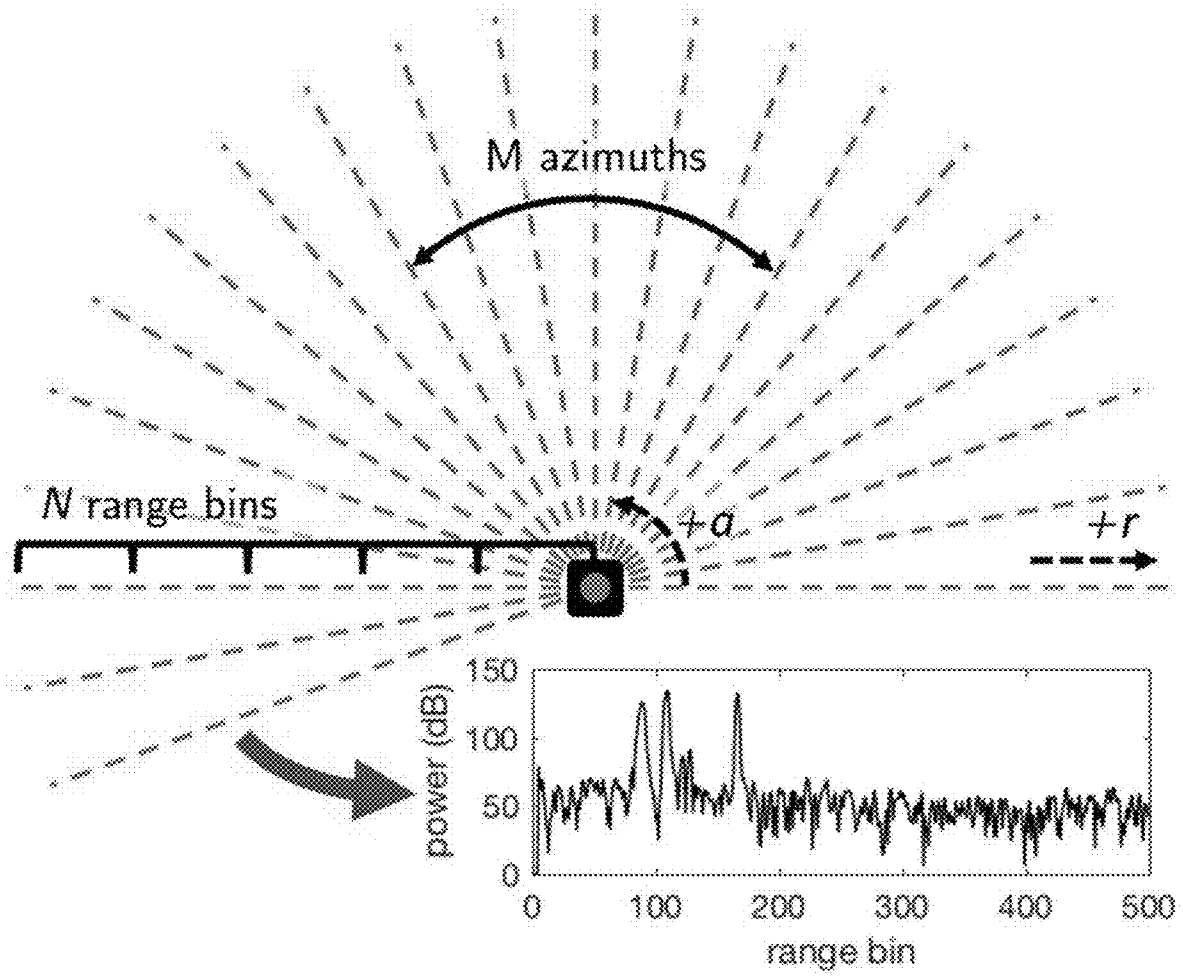
FIG. 1 schematically depicts a plan view of a radar sensor for an exemplary embodiment.

FIG. 1 schematically depicts a plan view of a radar sensor, particularly a FMCW scanning radar, for an exemplary embodiment. In this example, the radar sensor (green circle), centered on a vehicle (black box), sequentially gathers power-range spectra (dashed radial green rays) at each azimuth. Variables a and r denote azimuth and range, respectively. A sample signal for a particular azimuth is plotted, as power (dB) as a function of range bin.

Figure 2:
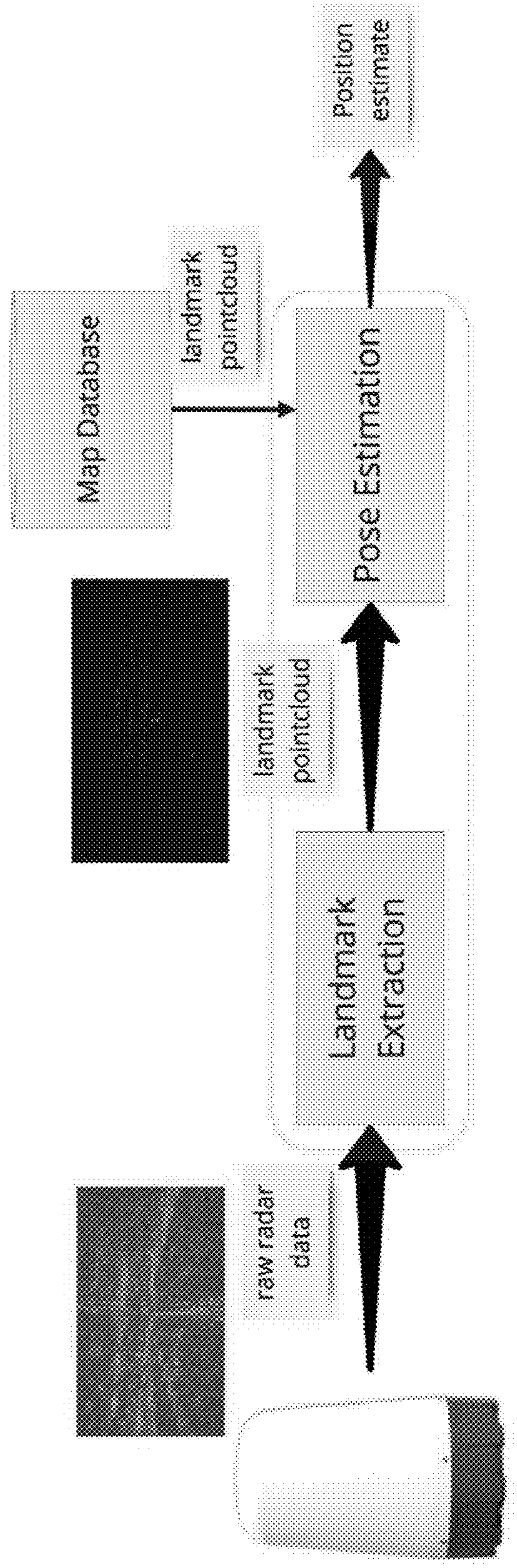
FIG. 2 schematically depicts a method according to an exemplary embodiment.

FIG. 2 schematically depicts a method according to an exemplary embodiment. The method is a computer-implemented method of localizing a radar sensor.

Generally, the method comprises two main steps: landmark extraction and pose estimation.

The method comprises obtaining a first radar scan of a first environment of the radar sensor, wherein the first radar scan comprises a set of power-range spectra, including a first power-range spectrum (i.e. a 1D signal).

The method comprises extracting a first set of landmarks, including a first landmark, from the first radar scan, wherein the first landmark is defined by a range and an azimuth. This step is also known as landmark extraction or feature extraction. CFAR is a common filtering algorithm but is not distinctive enough. In contrast, the method described herein is able to detect more reliable and distinctive landmarks in the radar scene data. For example, a full radar scan is received (i.e. obtained) from the radar sensor and the method performs landmark extraction in order to accurately detect objects in the environment up to the maximum range of the radar sensor, for example as described with reference to FIGS. 3 and 4. The radar scan is a set of power-range spectra (i.e. 1D signals), one for each azimuth, for example as described with respect to FIG. 1. In this example, the power-range spectra are represented as an array of values per azimuth, all the way around the radar sensor. In this example, the output from the landmark extraction is a point cloud, which is a set of points (corresponding to landmarks) each specified by its range and angle from the center line (i.e. azimuth).

Next, the pose estimation step uses the new landmark point cloud to determine its relative pose to the previous landmark point cloud, and also its position relative to the map database which contains the landmark point clouds captured over the route during the mapping phase.

The pose estimation step has two main sub-steps, first to compute the scene point descriptors and then to use these and the landmarks point cloud to align the two point clouds and thus estimate the difference in position between the two. The scene point descriptors are each a set of unique "descriptors" one for each point in the point cloud. Thus, a scene point descriptor is represented as a matrix of values with each column representing the descriptor of each point. A descriptor must be computed and is represented as a vector of values that uniquely describes that point such that it can be identified and matched in other scans. The descriptor specifies the landmark point by the radial statistics of neighbouring points, both in range and angular slices.

The method comprises computing a respective first set of descriptors, including a first descriptor, of the first set of landmarks, wherein the first descriptor defines the first landmark by respective relative ranges and azimuths in relation to one or more landmarks included in the first set of landmarks, for example as described with reference to FIG. 5.

The method comprises accessing one or more reference sets of landmarks of respective environments and computing respective reference sets of descriptors of the reference sets of landmarks, for example as described with reference to FIGS. 6 to 8.

The method comprises matching the first set of descriptors to a corresponding first reference set of descriptors, for example as described with reference to FIGS. 6 to 8. This is known as data association and matches landmarks across radar scenes. Other approaches use feature descriptors popularised for vision systems, but these do not perform as well for radar data. The inventors use a novel feature descriptor that is better suited to radar landmarks and improves data associations between the live scan and other scans seen in the past e.g. the previous scan in case of radar odometry or map scans in the case of localization.

The method comprises localizing a first location of the radar sensor using a first result of the matching, for example as described with reference to FIGS. 6 to 8. This step is also known as position estimation and determines the spatial distance between two landmark sets.

Figure 3:
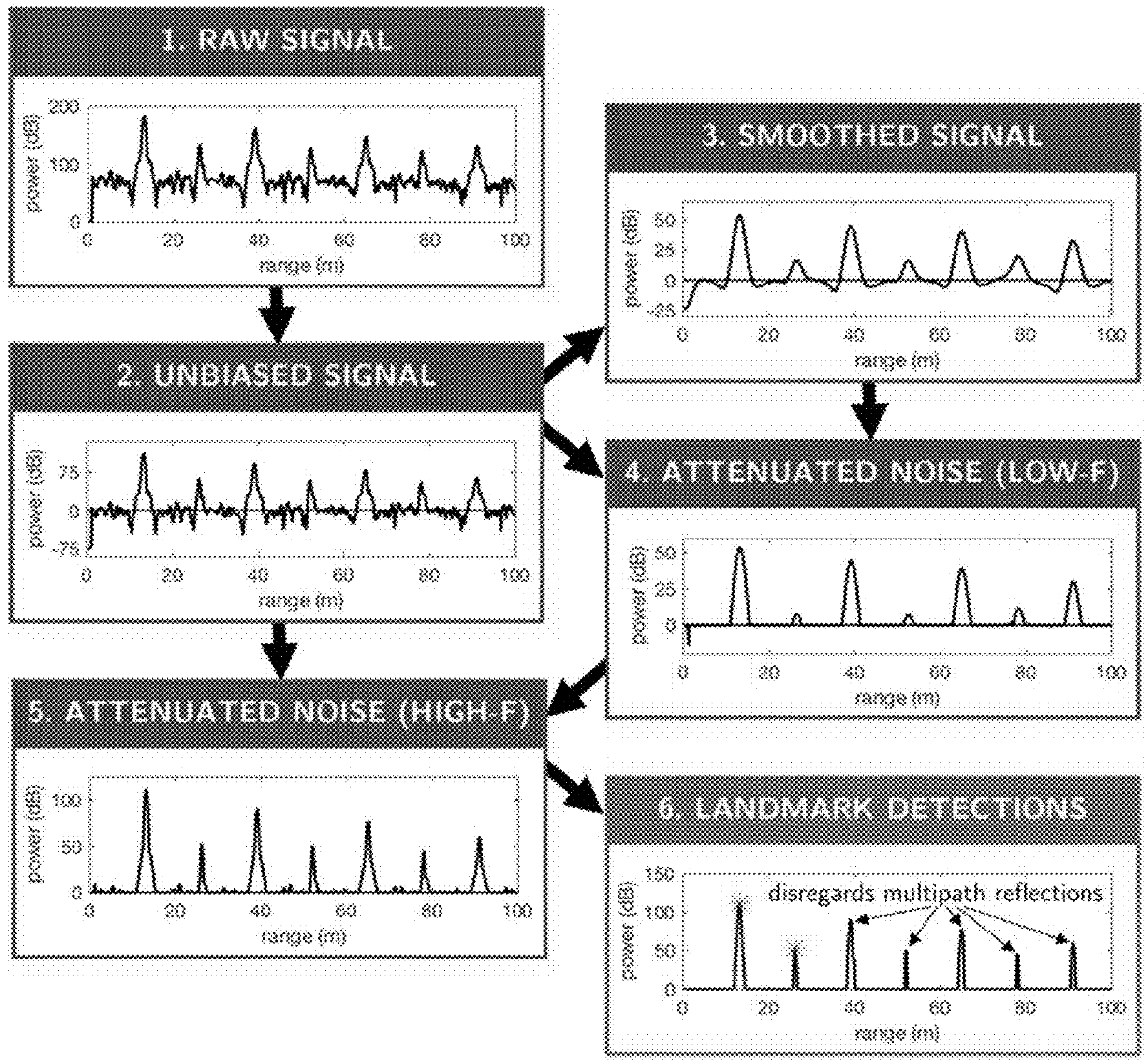
FIG. 3 schematically depicts the method of FIG. 2, in more detail.

FIG. 3 schematically depicts the method of FIG. 2, in more detail. Particularly, FIG. 3 schematically depicts a procedure for landmark extraction from a power-range spectrum. The input (raw signal) is processed from the top-left to produce the output on the bottom-right, in which the landmarks are denoted with red asterisks. Box 6 in this example highlights the ability of our approach to remove detections due to multipath reflections and noise. Boxes 3 and 5 demonstrate the importance of incorporating the high-frequency signals since using the smooth ones in boxes 2 and 4 alone would discard the high range resolution provided by an FMCW radar.

The first objective is to accurately detect objects in the radar sensor's environment with minimal false positives. Specifically, the method should find all landmarks perceived by the radar sensor while minimizing the number of redundant returns per landmark and avoiding the detection of nonexistent landmarks, such as those due to noise, multipath reflections, harmonics, and sidelobes. The method accepts power-range spectra (i.e. 1D signals), as inputs and returns a set of landmarks, each specified by its range and azimuth. The core idea is to estimate the signal's noise statistics then scale the power value at each range by the probability that it corresponds to a real detection. Continuous peaks in this reshaped signal are treated as objects; per peak, only the range at the centre of the peak is added to the landmark set.

Let the vector $s(t) \in R^{N \times 1}$ be the power-range spectrum at time t such that the element si is the power return at the i-th range bin, and $\alpha(t)$ is the associated azimuth. Let $r(i)=\beta(i-0{:}5)$ give the range of bin $i \in \{1, 2, \ldots, N\}$, where $\beta$ is the range resolution. Suppose that $y(t) \in R^{N \times 1}$ is the ideal signal if the environment was recorded perfectly. Then, $s(t)=y(t)+v(y(t))$, where v represents unwanted effects, like noise. Therefore, inferring y(t) from s(t) in order to accurately isolate the landmarks requires an approximation of v(y(t)) such that $\hat{y}(t)=s(t)-\hat{v}(s(t))$, =. Removing $\hat{v}$ from s is the aim of the method. The landmark detections extracted from $\hat{y}(t)$ are stored in the set L(s(t)). The landmark extraction method, as described next, references FIG. 4 and Algorithm 1.

FIG. 4 is an example of an algorithm, Algorithm 1, of landmark extraction for the method of FIG. 2

To begin, an unbiased signal q that preserves high-frequency information (box 2) is acquired by subtracting the noise floor of v(s) from s (line 1). The result is then smoothed to obtain the underlying low frequency signal p (box 3), which better exposes obvious landmark peaks (line 2). At this point, q is not discarded for two reasons: radar landmarks often manifest as high frequency peaks, so smoothing would dampen their presence; and smoothing muddles the peaks of landmarks that are in close proximity, making it difficult to distinguish between them. Thus, we integrate the information of both q and p. To estimate the noise characteristics, we treat the values of q that fall below zero as Gaussian noise with mean $\mu_q=0$ and standard deviation $\sigma_q$ (line 4). Let $f(\mu,\sigma^2)$ be the probability density at x for the normal distribution $N(\mu,\sigma^2)$. Then, for every range bin, the power values are scaled by the probability that they do not correspond to noise in two steps. First, each value of the smoothed signal $p_i$ is scaled by $$f(0, \sigma_q^2)$$

(box 4 and line 8). This process is repeated for the high-frequency signal $q_i$ relative to the smoothed signal $p_i$ such that the scaling factor is $$f(p_i, \sigma_q^2)$$

(box 5 and line 9). The sum of both values is stored in $\hat{y}_i$. These steps integrate high- and low-frequency information to preserve range accuracy while suppressing signal corruptions due to noise. Finally, the $\hat{y}_i$ values that are below the upper $z_q$-value confidence bound of $$N(\mu, \sigma_q^2)$$

and therefore less likely to represent real landmarks are set to zero (box 6 and line 10).

The method extracts landmarks from $\hat{y}_i$ (the black signal in box 6) as follows. All values of $\hat{y}$ are now either zero or belong to a peak. For each peak's centre located at range bin i, the tuple (a,r(i)) is added to the landmark set L(s) (line 11). These landmarks are then tested, and those identified as multipath reflections (MR) are removed (box 6 and line 12). Since MRs cause peaks with similar wavelet transform (WT) signatures to appear in the power-range spectrum at different ranges with amplitudes that decrease with distance, this step compares the continuous WTs $w_i, w_j \in \mathbb{R}^{H\times 1}$ for each set of peaks $P_i$ and $P_j$ where j>i. If $$\frac{d_{ij}}{H} < d_{thresh}$$

and the maximum power of $P_i$ is greater than that for $P_j$, where $$d_{ij} = \left| \frac{w_i}{\max(w_i)} - \frac{w_j}{\max(w_j)} \right|$$

is a measure of dissimilarity, then $P_j$ is considered a MR, and (a,r(j)) is removed from the landmark set L(s). MR removal produces good results but requires significant computation time, making it optional. The method requires three free parameters with an optional fourth. In general, $w_{median}$ should represent a distance large enough to span multiple landmarks, and $w_{binom}$ should be around the width of an average peak $$\left(\sim \frac{w_{median}}{2}\right).$$

A greater $z_q$ value raises the standard for peaks to be chosen as landmarks over noise, and $d_{thresh}$ is the minimum difference between WTs for detections to be considered independent. For the following analyses, let $L=\bigcup_{t\le\tau<t'} L(s(\tau))$ be the set of all landmarks in one full scan from time t to t'.

Figure 5:
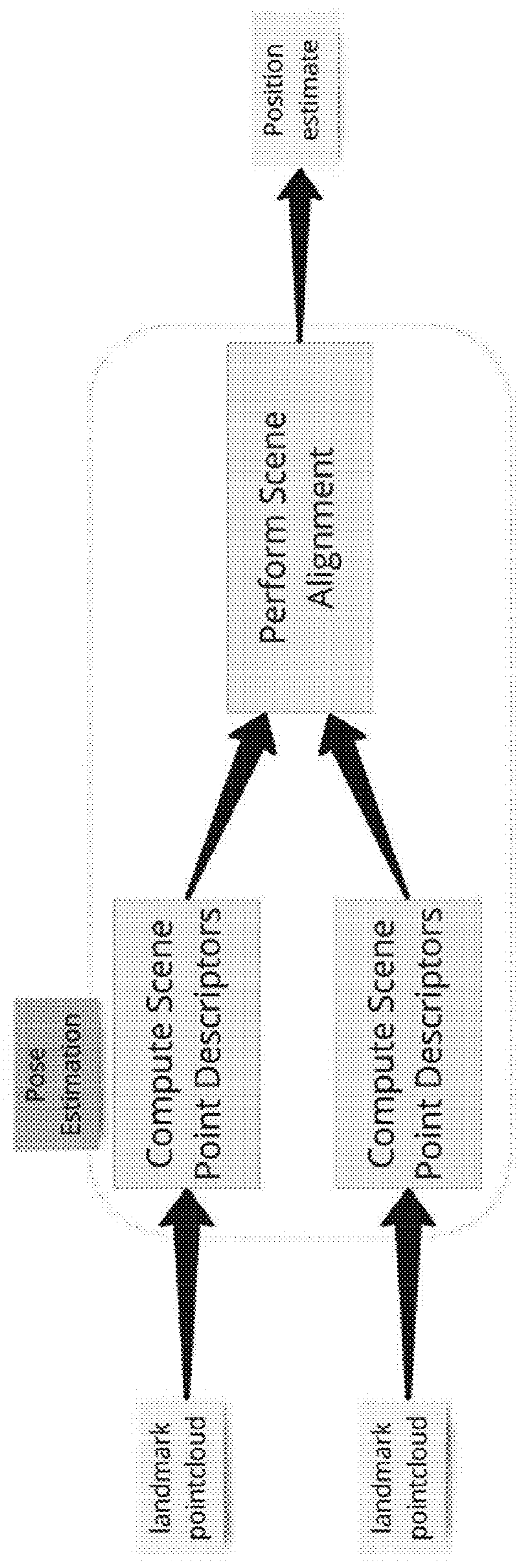
FIG. 5 schematically depicts the method of FIG. 2, in more detail.

FIG. 5 schematically depicts the method of FIG. 2, in more detail.

In this example, the pose estimation step uses the output landmark point cloud to determine the position (i.e. the first location) of the radar sensor, relative to a map database which contains reference landmark point clouds (i.e. reference landmarks), for example captured or acquired over a route during a mapping phase of the radar sensor. In addition, in this example, the pose estimation step uses the output landmark point cloud to determine the position relative to previous landmark point cloud (i.e. for odometry).

The pose estimation step has two main sub-steps: firstly to compute the scene point descriptors and secondly to use the scene point descriptors and the landmarks point cloud to align the two point clouds and thus estimate the difference in position between the two. The scene point descriptors are each a set of unique "descriptors", one for each point in the point cloud. Thus, in this example, a scene point descriptor is represented as a matrix of values with each column representing the descriptor of each point. A descriptor is computed and is represented as a vector of values that uniquely describes that point such that the point can be identified and matched in other scans. The descriptor specifies the landmark point by the radial statistics of neighbouring points, both in range and angular slices.

Figure 6:
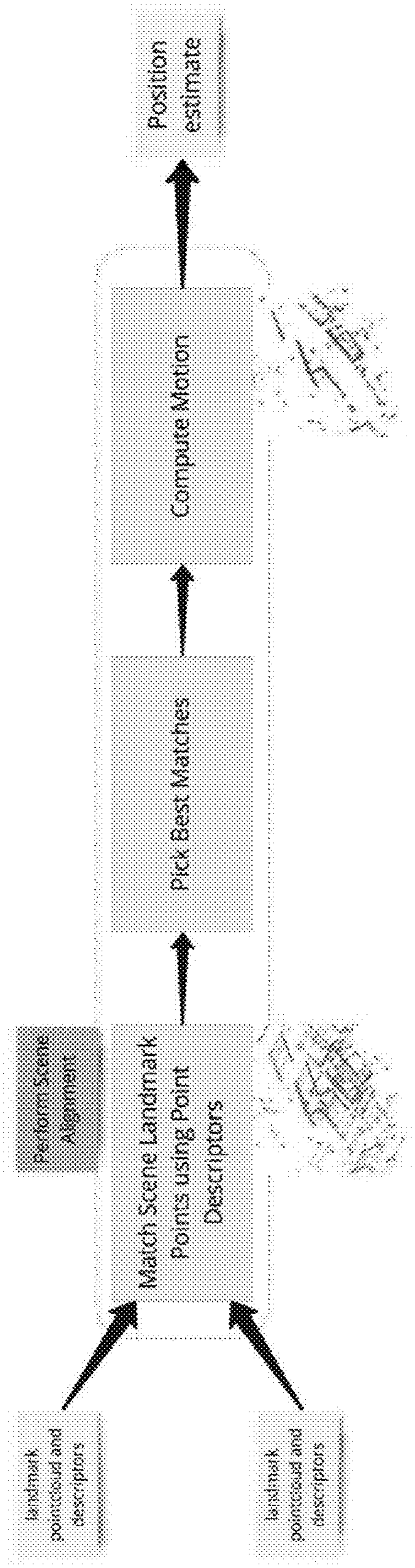
FIG. 6 schematically depicts the method of FIG. 2, in more detail.

FIG. 6 schematically depicts the method of FIG. 2, in more detail.

Once the scene point descriptors have been computed, the scene point descriptors can be used to perform the data association step to match each landmark point from one radar scan to a landmark point in the other radar scan. Finding the best matching descriptors from one scan to those in the other can be computationally expensive and the inventors have developed a number of improvements for efficiency, as described herein. Once a set of correspondences from one point cloud to the other point cloud is determined, the aim is to pick the best matches to ensure that the alignment between the point clouds is robust to outliers and false positives. Given good overlap between scans and stable associations, the motion of the sensor that must have occurred from one scan to the other may be computed. In this example, the motion estimate is output by the computer.

Figure 7:
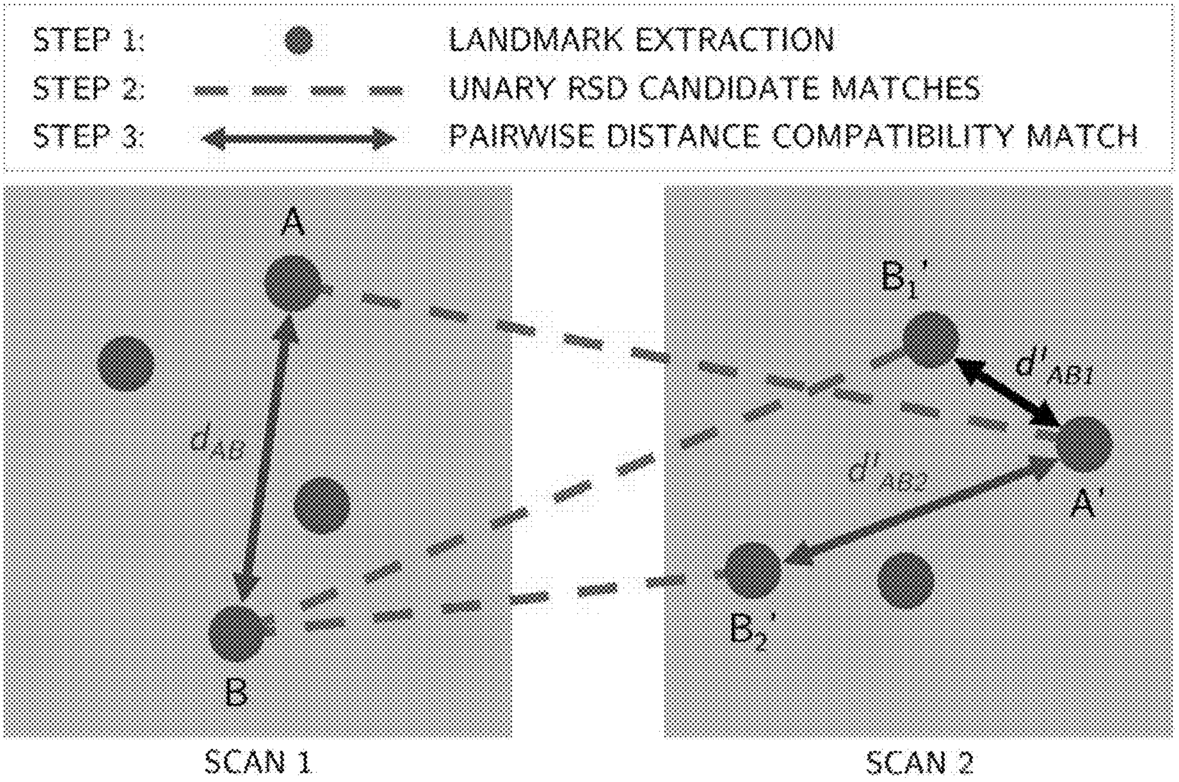
FIG. 7 schematically depicts the method of FIG. 2, in more detail.

FIG. 7 schematically depicts the method of FIG. 2, in more detail. The core idea behind the data association algorithm that seeks to find similar shapes within the two landmark point clouds (in red) extracted from radar scans. The unary candidate matches (dotted green lines) are generated by comparing the points' angular characteristics. The selected matches (A,A') and (B,B'$_2$) minimize the difference between pairwise distances ($|d_{AB}-d'_{AB2}|<|d_{AB}-d'_{AB1}|$). In this way, shape matching by sequentially comparing angles and side lengths is approximated.

In more detail, the scan matching algorithm achieves robust point correspondences using high-level information in the radar scan. Intuitively, it seeks to find the largest subsets of two point clouds that share a similar shape. Unlike ICP, this method functions without a priori knowledge of the scans' orientations or displacements relative to one another. Thus, our algorithm is not constrained to have a good initial estimate of the relative pose and can be compare point clouds captured at arbitrary times without a map. The only requirements are that the areas observed lie in the same plane and contain sufficient overlap. One of the key attributes of our approach is to perform data association using not only individual landmark (i.e. unary) descriptors, but also the relationships between landmarks. For instance, imagine three landmarks that form the vertices of a scalene triangle. Then, the set of distances from each point to its neighbours is unique to that point regardless of the overall point cloud's placement, allowing the landmark to be straightforwardly matched to its counterpart in any other point cloud acquired by applying a rigid body transformation to the original triangle. The greater the number of points, the less likely it is for an individual point to have the same set of pairwise distances to its neighbours as another. Moreover, the exact position and orientation of the point cloud does not influence the pairwise relationships within it, so great disparities between the placements and orientations of the point clouds are inconsequential. We harness these observations to obtain reliable matches for our large landmark sets. With real data, the main challenges are that the landmark locations and detections are noisy, meaning that points do not always survive the rigid body transformation and the locations of those that do are affected by noise. A simple example illustrating the concept behind the data association algorithm is shown in FIG. 7.

FIG. 8 is an example of an algorithm, Algorithm 2, of data association for the method of FIG. 2. As inputs, it accepts two point clouds $L^O$ and $L^I$ for each of the two radar scans. The first point cloud $L^O$ is the original set of landmarks in Cartesian coordinates. Because landmarks are detected in polar space, the resulting point cloud will be dense at low ranges and sparse at high ones. The second point cloud $L^I$ compensates for this by generating a binary Cartesian grid of resolution that is interpolated from the binary polar grid of landmarks. The latter point cloud is less exact and only used to sidestep the range-density bias when processing the layout of the environment while data association is performed on the former (i.e. the algorithm returns a set of matches M that contains tuples (i,j) such that the landmark $$L_1^O\{i\}$$

corresponds to $$L_2^O\{j\}.$$

This distinction is a key insight. It preserves accuracy by operating on the landmarks detected in polar space while correcting for a main difficulty of scanning radars by interpreting the environment in Cartesian space. The data association is then performed in four steps. First, for every point in $$L_1^I,$$

the unaryMatches function suggests a potential point match in $$L_2^O$$

based on some unary comparison method (line 1). Next, the non-negative compatibility score for each pair of proposed matches g=(i,i') and h=(j,j') is computed and assigned to the elements (g, h) and (h, g) of the W×W matrix C such that it is symmetric and diagonally dominant (line 2). If the landmark matches g and h are correct, then the relationship between i and j in the first radar scan is similar to that between i' and j' in the second; the compatibility score reflects this pairwise similarity. In our method, the value is computed from the distances between corresponding pairs of points in the two scans. It reflects the understanding that real, correctly identified landmarks are the same distance apart in any two radar scans. The optimal set of matches M maximizes the overall compatibility, or reward. Suppose that $m\in\{0,1\}^W$ such that (1) $m_i$=1 if the unary match B{i} is deemed plausible and $m_i$=0 otherwise; and (2) the selected matches do not conflict (i.e. a point in one point cloud cannot correspond to two in the other). Then, the optimal solution m* satisfies:

$$m^* = m\,Cm$$

Due to the discretization of m, this maximization is computationally difficult, so we relax the aforementioned constraint to seek the continuously-valued u* such that:

$$u^* = u\,Cu$$

Under these conditions, u* is the normalized eigenvector of the maximum eigenvalue of the positive semi-definite matrix C. The optimal solution m* is then be approximated from u* using the greedy approach shown in lines 3-11. In short, the greedy method iteratively adds satisfactory matches to the set M. On each iteration, the remaining valid matches are evaluated (line 7), that which returns the maximum reward is accepted (line 9), and those that conflict with it are removed from further consideration (lines 10 and 11). When the most recently selected match yields a reward less than the that if all matches were valued equally (i.e. is a weak match) or more than a percent of the landmarks in either set are matched, the algorithm terminates (lines 6 and 8). Note that is the only free parameter in this method, and no outlier removal is required.

Figure 9:
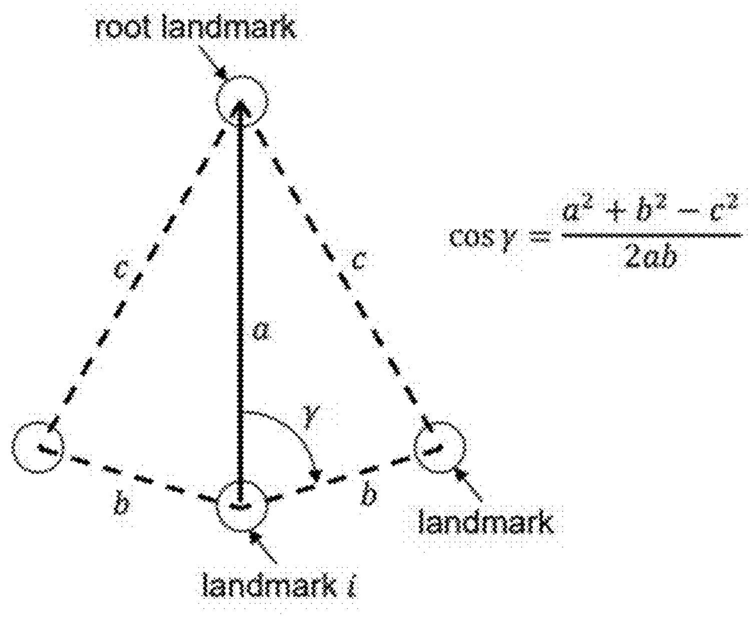
FIG. 9 schematically depicts the method of FIG. 2, in more detail.

FIG. 9 schematically depicts the method of FIG. 2, in more detail.

In this example, computing the first set of descriptors, including the first descriptor, of the first set of landmarks comprises triangulating the first landmark with respect to a respective node and a landmark of the first set of landmarks. In this example, triangulating the first landmark with respect to the respective node and the landmark of the first set of landmarks comprises using the cosine rule.

The root (also known as reference) landmark or point is fixed for landmark or point i. Angles and distances in respect of all landmarks or points may be thus computed efficiently, for each root landmark.

In summary, the parallel computation using SIMD and the cosine rule are computed simultaneously. As an example, point cloud data in the form of descriptors is retrieved. The point cloud data is divided into a plurality of chunks. The number of points in a chunk is determined based on processor capacity. A single instruction may be executed to apply a single instruction to each point in the group simultaneously. The single instruction may be to compute distances between the points within the chunk. Once the distances are known, the cosine rule is used to compute the angles of the points within the chunk, again using a single instruction such as SIMD.

Once a first chunk has been processed in this way, a second chunk is selected, and so forth. In this way, the parallel processing of each chunk of the plurality of chunks is performed.

Processing of the plurality of chunks occurs in series. In this way, all chunks may processed. The order in which the chunks are selected for processing may be selected at random.

Signatures

In this example, the radar signature header defines three datatypes: Signature, a two dimensional vector of doubles representing the radar signature itself. ExperienceSignatures, which is a std::map of Signatures indexed by node_id, and MapSignatures, which is a std::map of ExperienceSignatures indexed by experience_name.

A radon::loopclosure::RadarSignatureBuilder class is defined which has a three argument constructor corresponding to the signature range, azimuth bins and range bins parameters discussed above. The RadarSignatureBuilder will generate signatures which correspond to these parameters. A RadarSignatureBuilder object has a ComputeSignature method which will generate a Signature given a point cloud of radar landmarks extracted from the raw radar scan.

There is also a ComputeSignaturesForMap method which, given a map_client and a string representing the attribute name used to store radar data, will return a MapSignatures datatype for the entire map.

A function is provided, CompareSignatures, which will compute the similarity score for any given pair of Signatures. Two further functions make use of this comparison function:

- FindCandidateLoopClosureNodes, takes a Signature, ExperienceSignatures and a threshold, and returns a std::vector of all node ids in the experience with similarities below the threshold. This function is intended for using the signatures during map building.
- For localization the function, FindBestCandidateMapNode, is provided. Given a Signature, MapSignatures and a threshold, this returns the single best matching node_id in the map, provided it is below the similarity threshold.

Figure 10A:
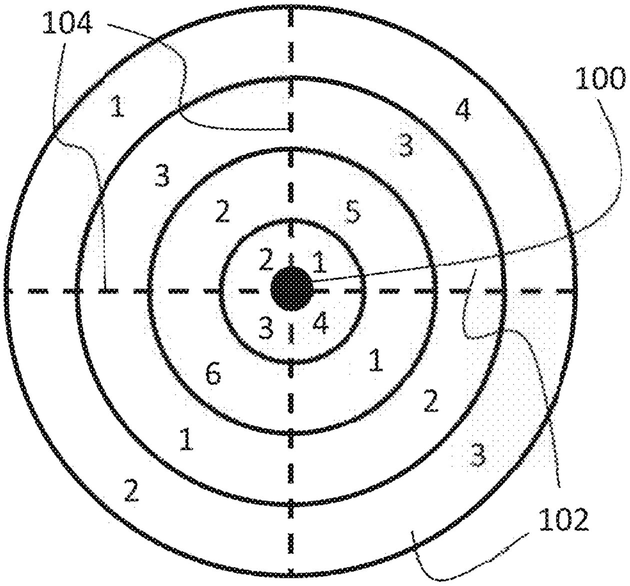
FIGS. 10A to 10C schematically depict a method of constructing signatures from radar scans.
Figure 10B:
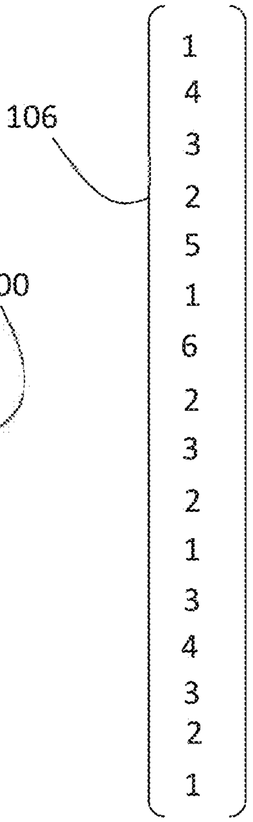
Figure 10C:
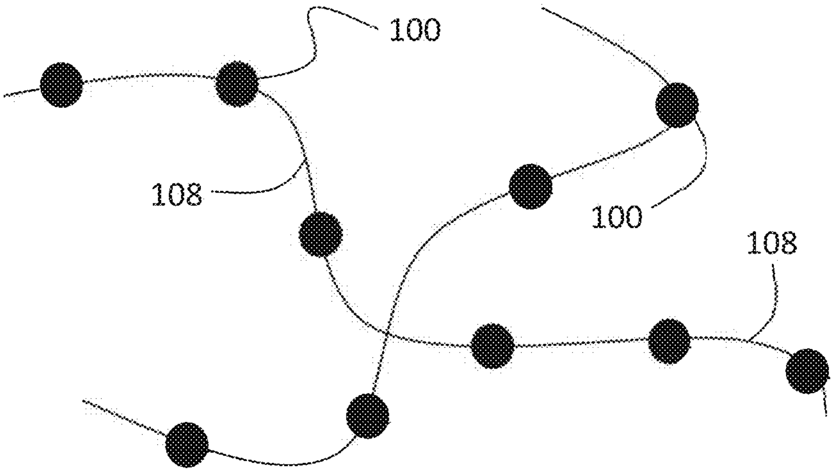

In other words, with reference to FIGS. 10A to 10C, when an autonomous vehicle traverses a route of a map, it captures radar scans. Each scan may be referred to as a node 100 having a location on the map where the scan was captured. In this way, a "node" may refer to a point at which a radar scan has been captured.

The scan at a node 100, captures features along a plurality of azimuths as shown in FIG. 1. A plurality of range bins are provided for each azimuth. This can be visualised as a plurality of concentric rings, each having the same number of segments 102 separated according to the distribution of azimuths 104 (only 4 azimuths shown in Figure to avoid obscuring the drawing).

Each segment 102 is assigned a number corresponding to a number of features detected in that segment by the radar scan.

A vector may be generated having a plurality of values. The number of elements in the vector corresponds to the number of segments. The value of each element equals the number from the corresponding segment. This vector is a signature 106. More specifically, this vector is described as a node signature.

The autonomous vehicle may capture a plurality of scans are different nodes along a route 108. As a result, a node signature for each node is generated, and they combine to form a route signature.

More than one route signature may be created if multiple routes have been traversed by the same or a plurality of autonomous vehicles. A route signature may be generated which includes the plurality of corresponding route signatures.

These previously generated signatures correspond to reference signatures.

In operation, a signature is generated for a current position. The signature for the current position may be called a first signature. The first signature is compared to the reference signatures to determine a closest match. The closest matched reference signature is correlated to the first signature. By correlating we mean that the first signature is equated to the closest matched reference signature. In this way, a position and pose of the first signature can be approximated using the closest matched reference signature.

Afterwards, position and pose can be determined more precisely using descriptor matching as described above. It is computationally much more efficient to obtain an approximation of position and pose of the radar sensor prior to determine a more precise position and pose as the estimation can indicate which points of the radar point cloud are likely starting points for the calculations.

REFERENCES

S. H. Cen and P. Newman, "Precise Ego-Motion Estimation with Millimeter-Wave Radar Under Diverse and Challenging Conditions," 2018 *IEEE International Conference on Robotics and Automation* (*ICRA*), 2018, pp. 6045-6052, doi: 10.1109/ICRA.2018.8460687.

The subject matter of the references is incorporated herein in entirety by reference.

Notes

Although a preferred embodiment has been shown and described, it will be appreciated by those skilled in the art that various changes and modifications might be made without departing from the scope of the invention, as defined in the appended claims and as described above.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method of localizing a radar sensor, the method comprising:
- obtaining a first radar scan of a first environment of the radar sensor, wherein the first radar scan comprises a set of power-range spectra, including a first power-range spectrum;
- extracting a first set of landmarks, including a first landmark, from the first radar scan, wherein the first landmark is defined by a range and an azimuth;
- computing a respective first set of descriptors, including a first descriptor, of the first set of landmarks, wherein the first descriptor defines the first landmark by respective relative ranges and azimuths in relation to one or more landmarks included in the first set of landmarks;
- accessing one or more reference set of landmarks of respective environments and computing one or more respective reference set of descriptors, where each of the one or more reference set of descriptors corresponds to one of the one or more reference sets of landmarks;
- matching the first set of descriptors to a corresponding first reference set of descriptors from the one or more respective reference set of descriptors; and
- localizing a first location of the radar sensor using a first result of the matching;
- wherein the method further comprises:
  - computing one or more values in response to a request;
  - storing the computed one or more values; and
  - in response to a subsequent request, returning at least one of:
    - the stored one or more values; and
    - one or more values derived from the stored one or more values;
- wherein the computed one or more values are selected from a group consisting of: a 3D eigen matrix of x,y,z, positions of landmarks in a scene, a matrix of point-to-point distances from each point to every other point of a landmarks point cloud, a matrix of angles between points of the landmarks point cloud, a point descriptors matrix computed from the landmarks point cloud, and a range vector computed from the landmarks point cloud;
- wherein the one or more values derived from the stored one or more values include a scene descriptors vector computed based on a descriptor template and a computed point descriptors matrix; and
- wherein the descriptor template includes trained and basis vectors used to project the full point descriptors in the scene down to a lower dimensional space.

2. The method according to claim 1, comprising:
- obtaining a second radar scan of the first environment of the radar sensor; extracting a second set of landmarks, including a second landmark, from the second radar scan;
- computing a respective second set of descriptors, including a second descriptor, of the second set of landmarks;
- matching the second set of descriptors to a corresponding second reference set of descriptors from the one or more respective reference set of descriptors;
- localizing a second location of the radar sensor using a second result, where the second result is from the matching of the second set of descriptors to a corresponding second reference set of descriptors; and
- calculating a motion of the radar sensor using the second location and the first location.

3. The method according to claim 1, wherein matching the first set of descriptors to the corresponding first reference set of descriptors comprises projecting the first descriptor to a first projected descriptor.

4. The method according to claim 1, wherein matching the first set of descriptors to the corresponding first reference set of descriptors comprises projecting the first descriptor to a first Eigen projected descriptor, wherein the first descriptor has a dimensionality $n_p>1$ and the first projected Eigen descriptor has a dimensionality $n_p=1$.

5. The method according to claim 1, wherein matching the first set of descriptors to the corresponding first reference set of descriptors comprises identifying M closest descriptors of the corresponding first reference set of descriptors and finding a single closest descriptor from amongst the M closest descriptors.

6. The method according to claim 1, comprising:
- projecting the first descriptor to a first projected descriptor, wherein the first descriptor has a dimensionality N and the first projected descriptor has a dimensionality M, wherein M≠N; and
  - wherein matching the first set of descriptors to the corresponding first reference set of descriptors comprises matching a first set of projected descriptors, including the first projected descriptor, to the corresponding first reference set of descriptors from the one or more reference set of descriptors.

7. The method according to claim 1, wherein the one or more values comprises the set of descriptors and computing the one or more values comprises computing the set of descriptors.

8. The method according to claim 1, comprising storing the reference sets of descriptors; and wherein matching the first set of descriptors to the corresponding first reference set of descriptors comprises matching the first set of descriptors to the corresponding first set of descriptors from the one or more reference set of descriptors.

9. The method according to claim 1, wherein computing the first set of descriptors comprises using a set of lookup tables, including a first lookup table.

10. The method according to claim 1, wherein computing the first set of descriptors, including the first descriptor, of the first set of landmarks comprises parallel processing of the first set of landmarks.

11. The method according to claim 1, comprising:

representing the first set of landmarks as a first signature;

representing each of the one or more reference set of landmarks as respective reference signatures; and correlating the first signature and a reference signature, thereby approximating the first location of the radar sensor, and wherein accessing the one or more of the reference set of landmarks comprises selectively accessing the one or more of the reference set of landmarks based upon their respective reference signatures.

* * * * *